United States Patent
Hirano et al.

(10) Patent No.: US 9,336,080 B2
(45) Date of Patent: May 10, 2016

(54) TRANSMISSION SYSTEM AND TRANSMISSION METHOD

(75) Inventors: Akira Hirano, Yokosuka (JP);
 Mitsunori Fukutoku, Yokosuka (JP);
 Yoshiaki Kisaka, Yokosuka (JP);
 Yoshiaki Sone, Yokosuka (JP); Akihiro Kadohata, Yokosuka (JP); Takafumi Tanaka, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 199 days.

(21) Appl. No.: 14/123,773

(22) PCT Filed: Jul. 4, 2012

(86) PCT No.: PCT/JP2012/067066
 § 371 (c)(1),
 (2), (4) Date: Dec. 4, 2013

(87) PCT Pub. No.: WO2013/005766
 PCT Pub. Date: Jan. 10, 2013

(65) Prior Publication Data
 US 2014/0108894 A1 Apr. 17, 2014

(30) Foreign Application Priority Data
 Jul. 4, 2011 (JP) .................. 2011-147956

(51) Int. Cl.
 *H03M 13/00* (2006.01)
 *G06F 11/10* (2006.01)
 (Continued)

(52) U.S. Cl.
 CPC .............. *G06F 11/10* (2013.01); *H04L 1/0009* (2013.01); *H04L 1/0041* (2013.01); *H04L 1/02* (2013.01); *H04L 2001/0096* (2013.01)

(58) Field of Classification Search
 CPC ..... H03M 13/03; H03M 13/235; G06F 11/10; G06F 11/1044; H04L 1/004; H04L 1/02
 See application file for complete search history.

(56) References Cited

U.S. PATENT DOCUMENTS

2002/0163890 A1 11/2002 Yoshimoto et al.
2005/0190766 A1 9/2005 Ochiai
(Continued)

FOREIGN PATENT DOCUMENTS

JP 2002009740 1/2002
JP 2002261854 9/2002
(Continued)

OTHER PUBLICATIONS

Birk et al., Improving network performance with Prioritized Dispersal, 2000, IEEE INFOCOM, pp. 1817-1826.*
(Continued)

*Primary Examiner* — Shelly A Chase
(74) *Attorney, Agent, or Firm* — Ohlandt, Greeley, Ruggiero & Perle, L.L.P.

(57) ABSTRACT

A transmission system includes: an error correction encoding agent which converts an input data sequence into an encoded data sequence constituted of an error correction code and coded data; a data distribution agent which divides the encoded data sequence from the error correction encoding agent, in a predetermined processing unit and send them to a plurality of transmission routes; a data combining agent which combines signal sequences from the respective transmission routes and restores the encoded data sequence; an error correction decoding agent which applies error correction to and decodes the encoded data sequence from the data combining agent and outputs the input data sequence; and an agent for configuration in which a redundancy in the error correction encoding agent and a degree of splitting of the encoded data sequence in the data distribution agent are set.

18 Claims, 34 Drawing Sheets

(51) Int. Cl.
*H04L 1/02* (2006.01)
*H04L 1/00* (2006.01)

(56) References Cited

U.S. PATENT DOCUMENTS

| | | |
|---|---|---|
| 2006/0280203 A1 | 12/2006 | Shimokuni et al. |
| 2007/0258391 A1 | 11/2007 | Ochiai |
| 2007/0274318 A1 | 11/2007 | Ochiai |
| 2010/0246389 A1 | 9/2010 | Toyoda et al. |

FOREIGN PATENT DOCUMENTS

| | | |
|---|---|---|
| JP | 2002368811 | 12/2002 |
| JP | 2004320434 | 11/2004 |
| JP | 2006352357 | 12/2006 |
| JP | 2010232787 | 10/2010 |
| JP | 2012109890 | 6/2012 |

OTHER PUBLICATIONS

International Preliminary Report of Patentability dated Jan. 16, 2004 corresponding to PCT/JP2012/067066, 2 pp.
Written Opinion of International Searching Authority dated Sep. 18, 2012 corresponding to PCT/JP2012/067066, 5 pp.
Yashima, Hiroyuki, "Convolutional code and Viterbi decoding" Triceps, published Sep. 13, 2000, pp. 9-29, 26 pp.
Partial English translation of Hiroyuki Yashima, "Conventional code and Viterbi decoding", Triceps, published Sep. 13, 2000, p. 9-29, 3 pp.
English translation of International Search Report dated Sep. 18, 2012 corresponding to PCT/JP2012/067066, 2 pp.
Horiuchi, et al., "GMPLS based Fault Recovery and Extra LSP Service utilizing protecting bandwidth" Technical Report of the Institute of Electronics, Information and Communication Engineers Technical Report, Photonic Network 103 (507). pp. 41-46, Dec. 11, 2003, 6 pp.
Yashima, Hiroyuki, "Conventional code and Viterbi decoding" Triceps, published Sep. 13, 2000, pp. 9-29, 23 pp.

* cited by examiner

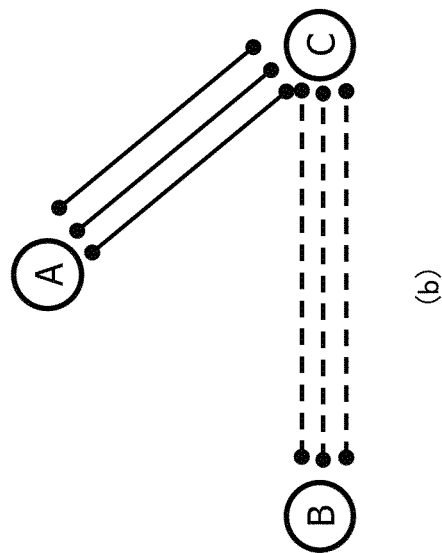
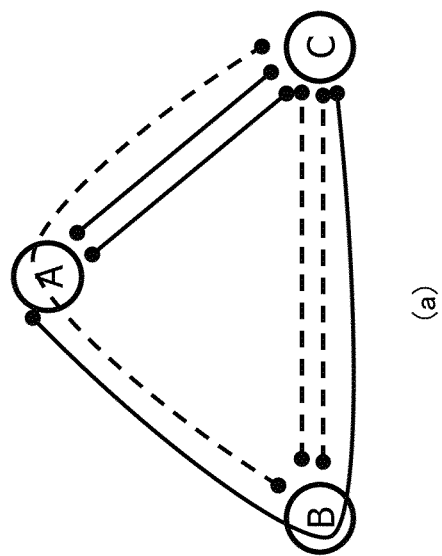
Fig.24

Fig.31

|  | PRIORITY IS CONSIDERED | PRIORITY IS NOT CONSIDERED |
|---|---|---|
| REDUNDANCY IS VARIABLE | 1) REDUCE REDUNDANCY OF LOW PRIORITY DATA<br>2) THIN LOW PRIORITY DATA<br>3) REDUCE REDUNDANCY OF HIGH PRIORITY DATA | 1) REDUCE REDUNDANCY<br>2) THIN DATA RANDOMLY |
| REDUNDANCY IS FIXED | 1) THIN LOW PRIORITY DATA | 1) THIN DATA RANDOMLY |

TRANSMISSION SYSTEM AND TRANSMISSION METHOD

BACKGROUND

1. Field of the Disclosure

The present disclosure relates to a transmission system and a transmission method which apply error correction coding to a digital signal from a client and decentralizes and sends the digital signal in a transmission interval constituted of a plurality of routes to collect again output signal from the transmission interval, and, thus, to perform error correction decode.

2. Discussion of the Background Art

In a present backbone such as a photonic network or a metro network, in order to enhance proof stress against a failure of an interface of a transmission device and a failure due to, for example, cutting of an optical fiber or to enhance reliability, there are undertaken efforts, such as transmitting the same signal to a plurality of routes or interfaces and build a system in the event of a failure of one of the interface and the optical fiber so that an actual transfer service is not affected.

In the conventional art, as such a protection technology, a 1+1 method, a 1:1 method, an N:1 method and so on are actually used. For example, in the 1+1 method shown in FIG. 1, a copy of a digital signal to be transmitted is created, and the copy is constantly transmitted simultaneously with the transmission of the original signal, using a transmission route of the original signal, a route different from an interface through which the signal passes, or an interface. In this technology, even if there occurs such an accident that a certain interface is failed, or a fiber in a certain interval is cut, by the use of a signal from a path or an interface which is not failed, the transmission of the digital signal is continued between a transmitting end and a receiving end without being stopped. In clients requiring high reliability, such a technology has been used.

Meanwhile, in the field of optical transmission technology, as described in the International Standard ITU-T G. 709, by the use of an error correction code, there has been realized a transmission method having high proof stress against, for example, a random error occurring in a transmission route interval. Consequently, enhancement of reliability and extension of the distance of the transmission interval are realized.

CITATION LIST

Non-Patent Literature

Non-Patent Literature 1: Eiichi Horiuchi, et al., "GMPLS based Fault Recovery and Extra LSP Service utilizing protecting bandwidth" TECHNICAL REPORT OF IEICE (THE INSTITUTE OF ELECTRONICS, INFORMATION AND COMMUNICATION ENGINEERS TECHNICAL REPORT, PN photonic network 103 (507), 41-46, 2003-12-11

Non-Patent Literature 2: Hiroyuki Yashima, "Convolution code and Viterbi decoding" Triceps, published 2000/9/13

For a network technology, further marketization and improvement of the efficiency are required, and a technology that obtains high reliability with a smaller amount of resources is required. In addition, there appear various services in which a required reliability level is different from each other, such as voice telephony, video delivery, financial transaction, and internet browsing. Thus, a technology that has high reliability and, in addition, can flexibly reliability design depending on the application is required to be created.

Thus, the present disclosure has been made in the above background, and a purpose of the present disclosure is to provide a transmission system, which can perform a transfer service with higher reliability, even using a smaller amount of network resources and can flexibly reliability design depending on the application, and a transmission method.

SUMMARY

In order to solve the above problem, in the transmission system and the transmission method according to the present disclosure, a digital signal from a client is subjected to error correction coding and, at the same time, sent to a plurality of routes and interfaces while being divided for each bit, and a receiving end collects the signals from the plurality of routes and the interfaces and applies error correction decoding processing to the signals to decode the original digital signal.

Specifically, a transmission system according to the present disclosure includes: an error correction encoding agent which converts an input data sequence into a coded data sequence constituted of an error correction code and coded data; a data distribution agent which divides encoded data sequence from the error correction encoding agent, in a predetermined processing unit and combines the divided data sequences with a plurality of transmission routes; a data combining agent which combines signal sequences from the respective transmission routes and decodes encoded data sequence; an error correction decoding agent which applies error correction to and decodes encoded data sequence from the data combining agent and outputs the input data sequence; and a agent for configuration in which a redundancy in the error correction encoding agent and a degree of splitting of encoded data sequence in the data distribution agent are set.

According to the present disclosure, a transmission control method of controlling a transmission system includes: an error correction encoding agent which converts an input data sequence into a coded data sequence constituted of an error correction code and coded data; a data distribution agent which divides encoded data sequence, from the error correction encoding agent, in a predetermined processing unit and combines the divided data sequences with a plurality of transmission routes; a data combining agent which combines signal sequences from the respective transmission routes and decodes encoded data sequence; and an error correction decoding agent which applies error correction to and decodes encoded data sequence from the data combining agent and outputs the input data sequence, wherein a redundancy in the error correction encoding agent and a degree of splitting of encoded data sequence in the data distribution agent are set according to the reliability of the transmission system.

An error correction code and a coded data sequence are divided in a predetermined processing unit and transmitted through a plurality of transmission paths, whereby an amount of resources can be reduced by a 1+1 method, and, on the other hand, degradation of communication quality associated with a route failure can be prevented using as an upper limit an error correction performance of the error correction code. Moreover, it is possible to design the number of multiple failures that can be relieved by designing the redundancy of an error correction method and the number of routes.

Accordingly, the present disclosure can provide a transmission system, which can perform a transfer service with higher reliability, even using a smaller amount of network resources and can flexibly reliability design depending on the application, and a transmission method.

In the transmission system according to the present disclosure, the agent for configuration sets an error correcting capability and a number of split paths in the error coding agent so that an availability of the plurality of transmission routes, and the availability of the entire transmission system of an input data sequence given by the error correcting capability and the number of split paths in the error coding agent satisfy a required availability of the entire transmission system.

In the transmission system according to the present disclosure, an error correcting capability and a number of split paths in the error coding agent are set so that an availability of the plurality of transmission routes, and the availability of the entire transmission system of an input data sequence given by the error correcting capability and the number of split paths in the error coding agent satisfy a required availability of the entire transmission system.

According to the present disclosure, even in a case where an availability of individual routes is low, a continuous bit number and a route distribution number capable of being suitably subjected to error correction are selected, whereby a high value of the availability of the entire transmission system can be realized.

According to the present disclosure, the transmission system further includes: a data for time sequence control input agent which, with regard to encoded data sequences divided by the data distribution agent, adds data for time sequence control, specifying a temporal position before combination with the transmission route, to each of the divided coded data sequences; and a agent for relative delay compensation which absorbs a delay difference in each of the transmission routes of the divided coded data sequence with reference to the data for time sequence control added by the data for time sequence control input agent and inputs the delay difference to the data combining agent.

In the transmission system according to the present disclosure, with regard to encoded data sequences divided by the data distribution agent, data for time sequence control specifying a temporal position before combination with the transmission route is added to each of the divided coded data sequences, the data for time sequence control added respectively to the divided coded data sequence propagating the transmission route is referred, and a delay difference in each of the transmission routes of the divided coded data sequence is absorbed.

According to the present disclosure, even when the respective lengths and delay amounts of the transmission route intervals are different from each other, a normal operation in the post stage of the error correction decoding can be realized by an effect of relative delay compensation using the data for time sequence control.

According to the present disclosure, the transmission system further includes: a multiplexing agent which makes encoded data sequences, propagating the respective transmission routes, a data sequence in which data sequences based on the input data sequences from a plurality of clients are multiplexed; and a separation agent which separates encoded data sequences, propagating the respective transmission routes, for each data sequence based on the input data sequences from the plurality of clients.

In the transmission system according to the present disclosure, encoded data sequence propagating each of the transmission routes is made a data sequence in which data sequences based on the input data sequence from the plurality of clients are multiplexed, and encoded data sequences propagating the respective transmission routes is separated for each data sequence based on the input data sequences from the plurality of clients.

According to the present disclosure, a larger amount of data from a client can be transmitted.

According to the present disclosure, the transmission system further includes a control agent which sets the redundancy in the error correction encoding agent and the degree of splitting of encoded data sequence in the data distribution agent are set in the agent for configuration for the each client.

In the transmission method according to the present disclosure, a redundancy in the error correction encoding agent and the degree of splitting of encoded data sequence in the data distribution agent are set for the each client.

In the conventional art, for example when a 1+1 protection method is set with respect to a certain transmission route, only the reliability realized by the same method can be provided in the transmission route. According to the present disclosure, coding having error correction performances different from each other with respect to signals from a plurality of clients is executed, and the degree of splitting of encoded data sequence is set for each client, whereby reliabilities different for each client can be easily realized, and, at the same time, coexistence of the different reliabilities can be realized in the transmission route concerned, so that the flexibility of network can be dramatically enhanced.

In the transmission system according to the present disclosure, the agent for configuration sets a change of the degree of splitting of encoded data sequence to the data distribution agent and the data combining agent.

In the transmission system according to the present disclosure, a change of the degree of splitting of encoded data sequence is set to the data distribution agent and the data combining agent.

The degree of splitting is decreased with respect to occurrence of transmission route failure, making it possible to allow an operating method with a high system operating ratio while suppressing reduction in allowable failure number.

In the transmission system according to the present disclosure, the agent for configuration transmits encoded data sequence whose portion is transmitted to the transmission route while commuting encoded data sequence to a transmission route different from the transmission route concerned.

In the transmission method according to the present disclosure, encoded data sequence whose portion is transmitted to the transmission route is transmitted while being commuted to a transmission route different from the transmission route concerned.

Load dispersion in a transmission route and efficient usage of transmission resources can be allowed without changing the degree of splitting and the redundancy with respect to an input data sequence and, at the same time, while maintaining system operation.

In the transmission system according to the present disclosure, the agent for configuration sets a change of the redundancy to the input data sequence in the error correction encoding agent and the error correction decoding agent.

In the transmission method according to the present disclosure, a change of the redundancy to the input data sequence is set in the error correction encoding agent and the error correction decoding agent.

The redundancy is suitably changed with respect to a transmitted traffic volume limit, whereby data can be transmitted without occurring overflow of the data.

In the transmission system according to the present disclosure, the control agent sets or changes the degree of splitting of encoded data sequence and the redundancy with respect to the input data sequence based on a prescribed priority.

In the transmission method according to the present disclosure, the degree of splitting of encoded data sequence or the redundancy with respect to the input data sequence are set or changed based on a prescribed priority.

When a failure occurs, a high priority data sequence is preferentially sorted into a normal transmission route, whereby coded data sequence of a high priority client can be normally restored.

The present disclosure can provide a transmission system, which can perform a transfer service with higher reliability, even using a smaller amount of network resources and can flexibly reliability design depending on the application, and a transmission method.

BRIEF DESCRIPTION OF THE DRAWINGS

FIG. 24 is a view for explaining an operation of the transmission system according to the present disclosure.

FIG. 31 is a view for explaining a feature of the transmission system according to the present disclosure.

DETAILED DESCRIPTION OF THE PREFERRED EMBODIMENT

Embodiment 1

Figure 1:
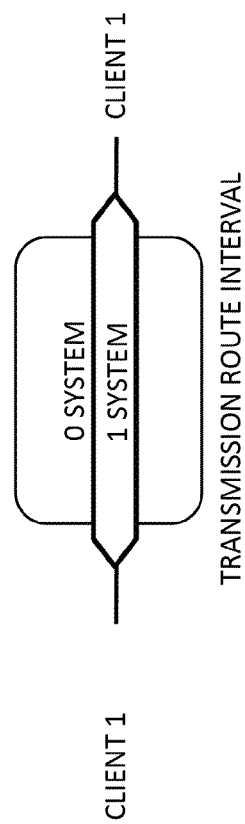
FIG. 1 is a view for explaining a conventional transmission system.

A transmission system 301 of an embodiment 1 is provided with an error correction encoding agent 10 which converts an input data sequence into a coded data sequence constituted of an error correction code and coded data, a data distribution agent 20 which divides encoded data sequence from the error correction encoding agent 10 in a predetermined processing unit and combines the divided data sequences with a plurality of transmission routes 30, a data combining agent 40 which combines the signal sequences from the transmission routes 30 and restores encoded data sequence, an error correction decoding agent 50 which applies error correction to and decodes encoded data sequence from the data combining agent 40 and outputs an input data sequence, and a agent for configuration 60 in which the redundancy in the error correction encoding agent 10 and the degree of splitting of encoded data sequence in the data distribution agent 20 are set.

Figure 3:
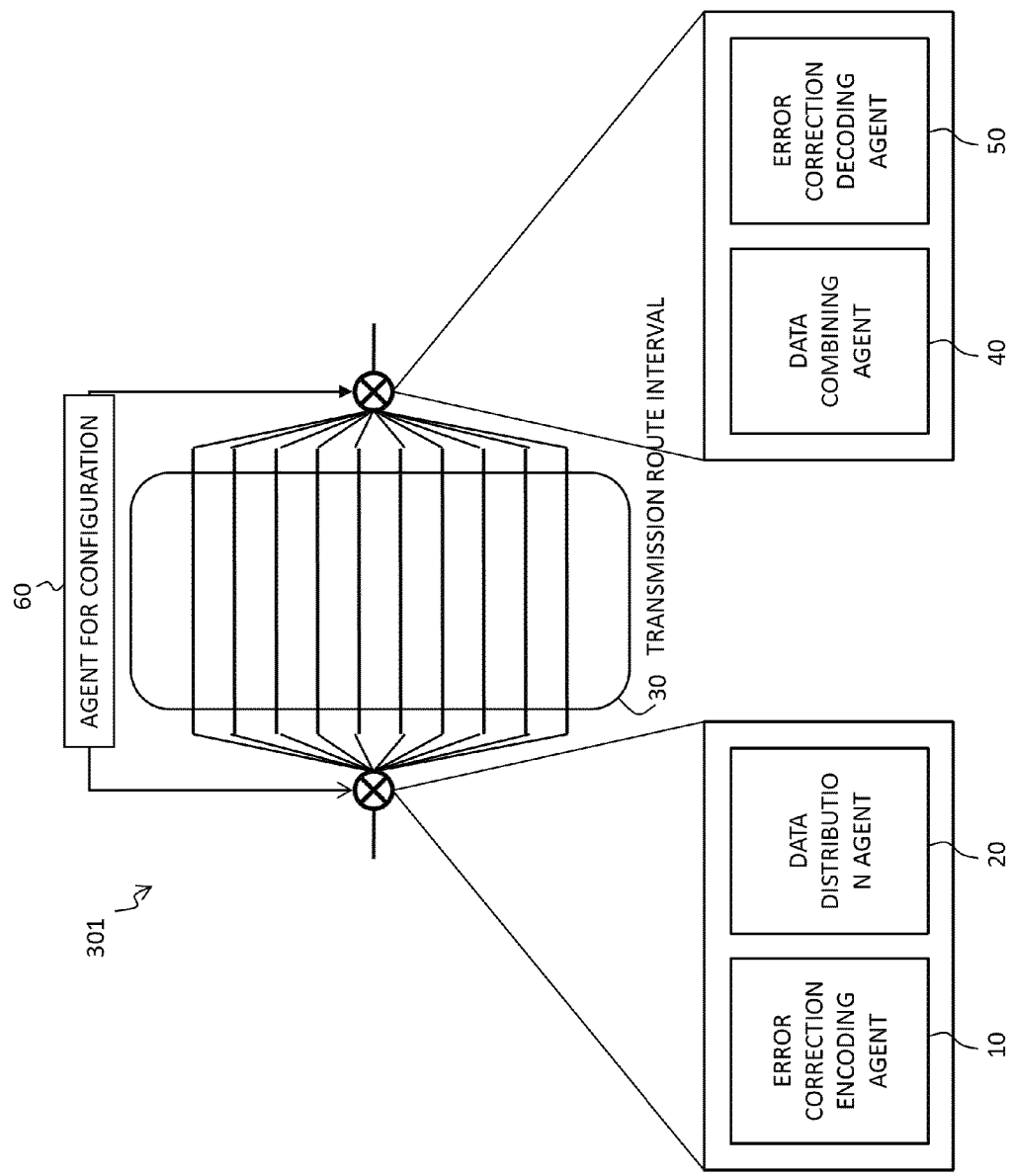
FIG. 3 is a view for explaining a transmission system according to the present disclosure.

A transmission system 301 will be explained using FIGS. 3, 4, 12, 13, and 14. FIG. 3 shows a basic configuration of the transmission system 301. The error correction encoding agent 10 applies the error correction coding to an input data sequence. The data distribution agent 20 decentralizes encoded data sequence to the transmission routes 30. The data combining agent 40 collects again the data sequences which passes through the transmission routes 30. The error correction decoding agent 50 applies the error correction decode to the collected data sequence. This is a principle constitution.

The error correction encoding agent 10 and the error correction decoding agent 50 of the transmission system 301 can use, as the error correction code, a convolution code for performing processing in the unit of bit and a block code for performing processing in the unit of byte or word can be used, for example.

The data distribution agent 20 decentralizes encoded data sequence in a predetermined processing unit. The "predetermined processing unit" referred to herein is a bit number not less than a bit number that is correctable if the error correction code is the convolution code and is a length of a data sequence not less than a code word length (data sequence length+ redundancy) used in the error correction code if the error correction code is the block code. More specifically, when the error correction code is the convolution code, the "predetermined processing unit" is a bit number not less than a correctable error interval or a bit number not more than burst error proof stress, and the data distribution agent 20 decentralizes encoded data sequence using the bit number as the predetermined processing unit. When the error correction code is the block code, the "predetermined processing unit" is the data sequence length not less than the code word length or the data sequence length not less than the interleave length, and the data distribution agent 20 decentralizes encoded data sequence using the data sequence length as the predetermined processing unit.

Figure 4:
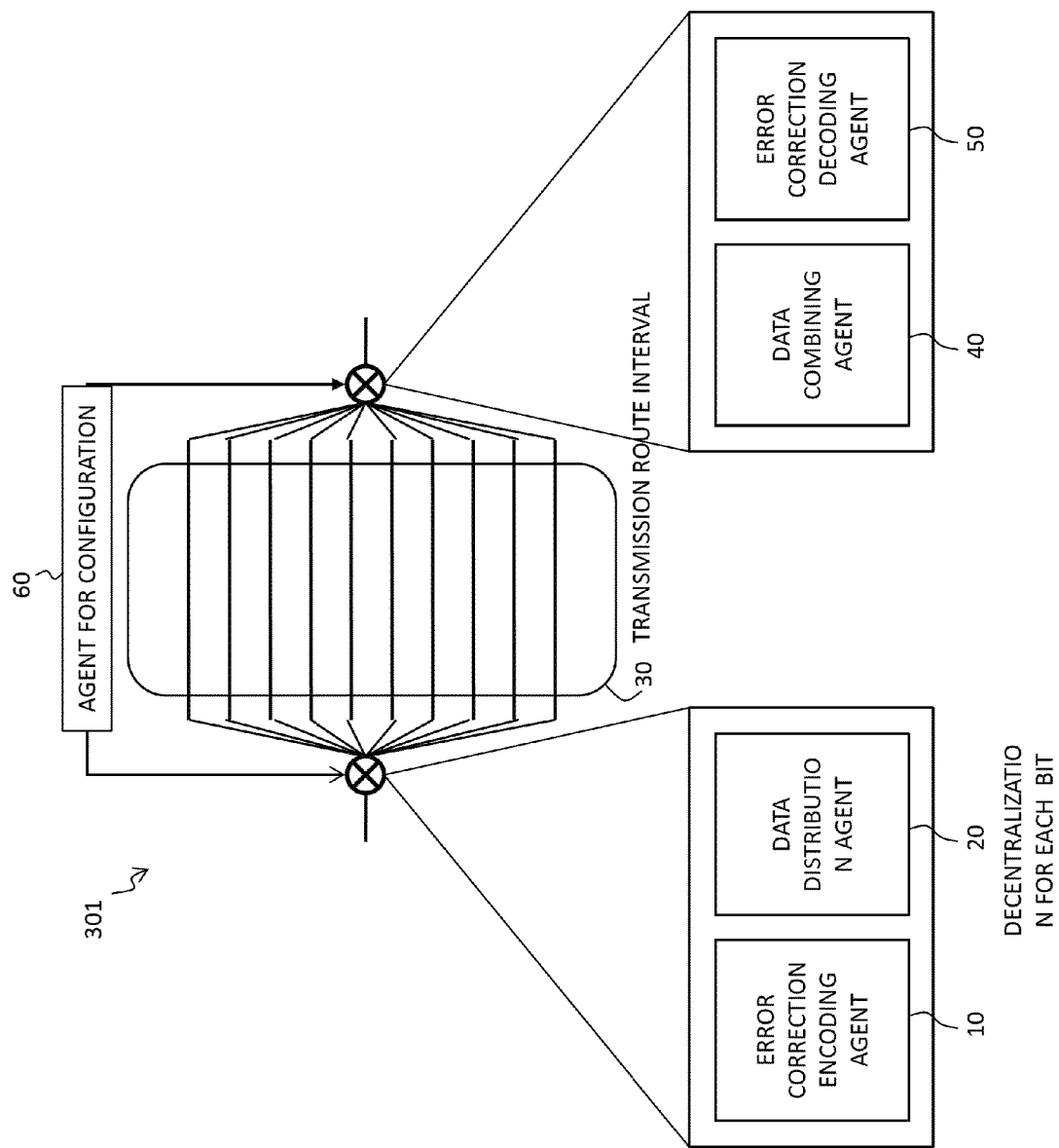
FIG. 4 is a view for explaining the transmission system according to the present disclosure.

FIG. 4 is a view for explaining a case where the error correction encoding agent 10 and the error correction decoding agent 50 perform processing in the unit of bit as the error correction code. In the transmission system 301 of FIG. 4, for the purpose of complete failure relief, the degree of splitting of encoded data sequence is required to be equal to or larger than the error interval capable of error correction as in the condition 1.

(Condition 1)

Complete protection (complete error correction) condition

Data decentralization number≥error interval capable of error correction

The data decentralization number referred to herein is a number of transmission routes or a number of interfaces. The interval depends on a set error correction method.

Moreover, in the transmission system 301 of FIG. 4, for the purpose of complete failure relief, a division unit of encoded data sequence is required to be less than the burst error stress proof as in the following condition 2.

(Condition 2)

Complete protection (complete error correction) condition

Decentralized division unit≤burst error stress proof of error correction method

In the transmission system 301 to be described below, the error correction code used in the error correction encoding agent 10 and the error correction decoding agent 50 is the convolution code, a correctable error interval is 10, and a continuous error up to 3 bits can be corrected. Thus, in the transmission system 301, the degree of splitting of encoded data sequence is set to not less than 10.

Figure 12:
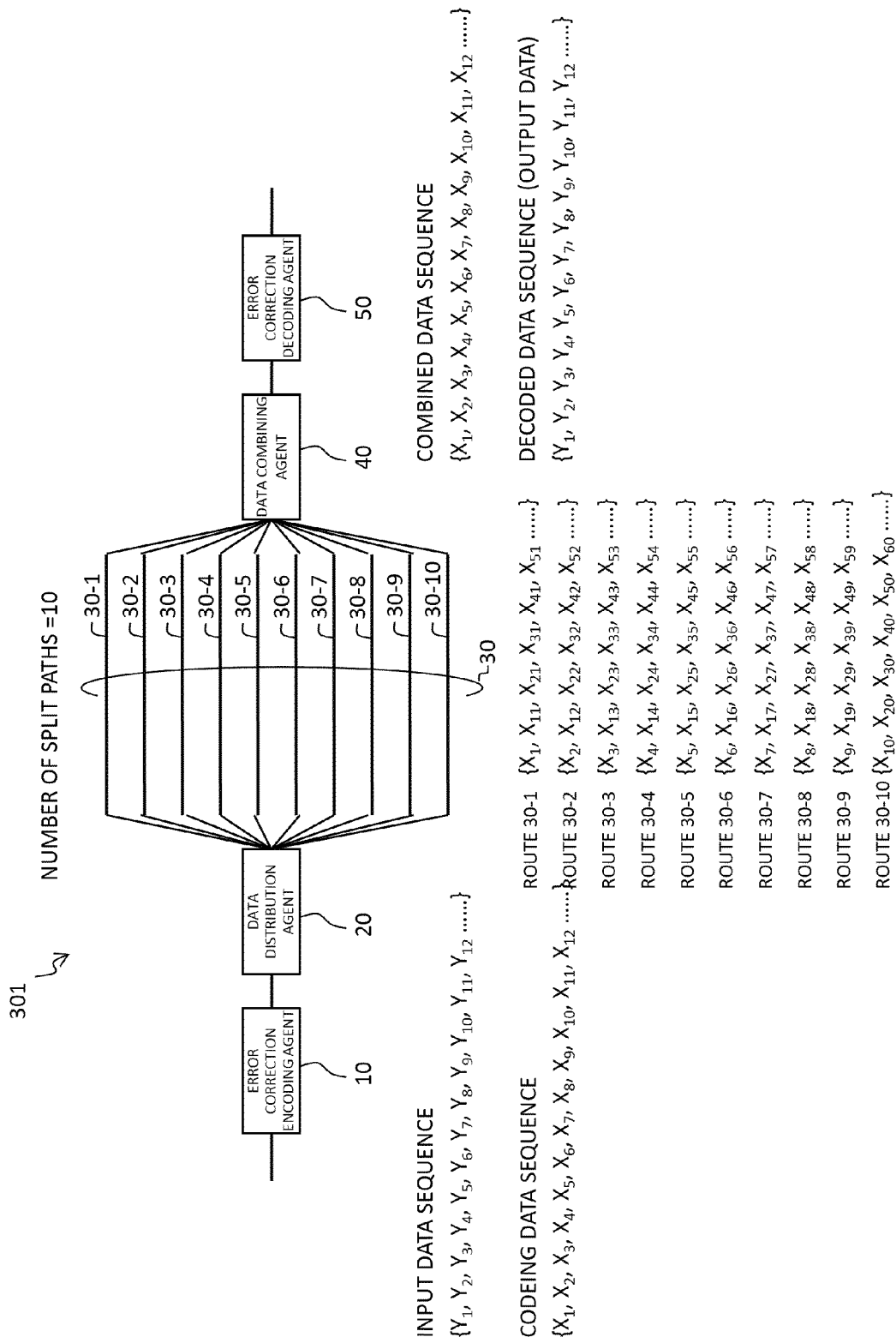
FIG. 12 is a view for explaining an operation of the transmission system according to the present disclosure.
Figure 13:
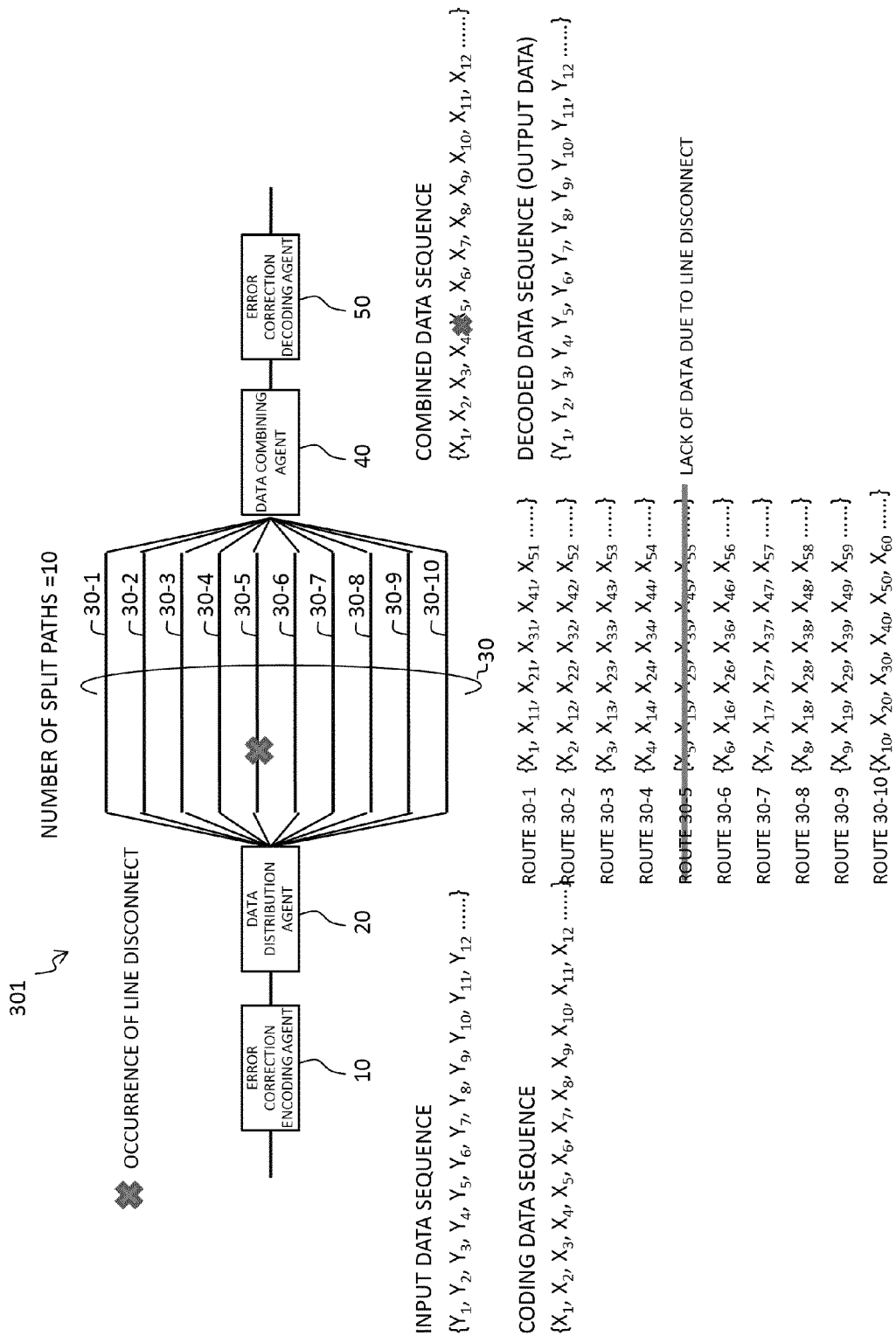
FIG. 13 is a view for explaining an operation of the transmission system according to the present disclosure.
Figure 14:
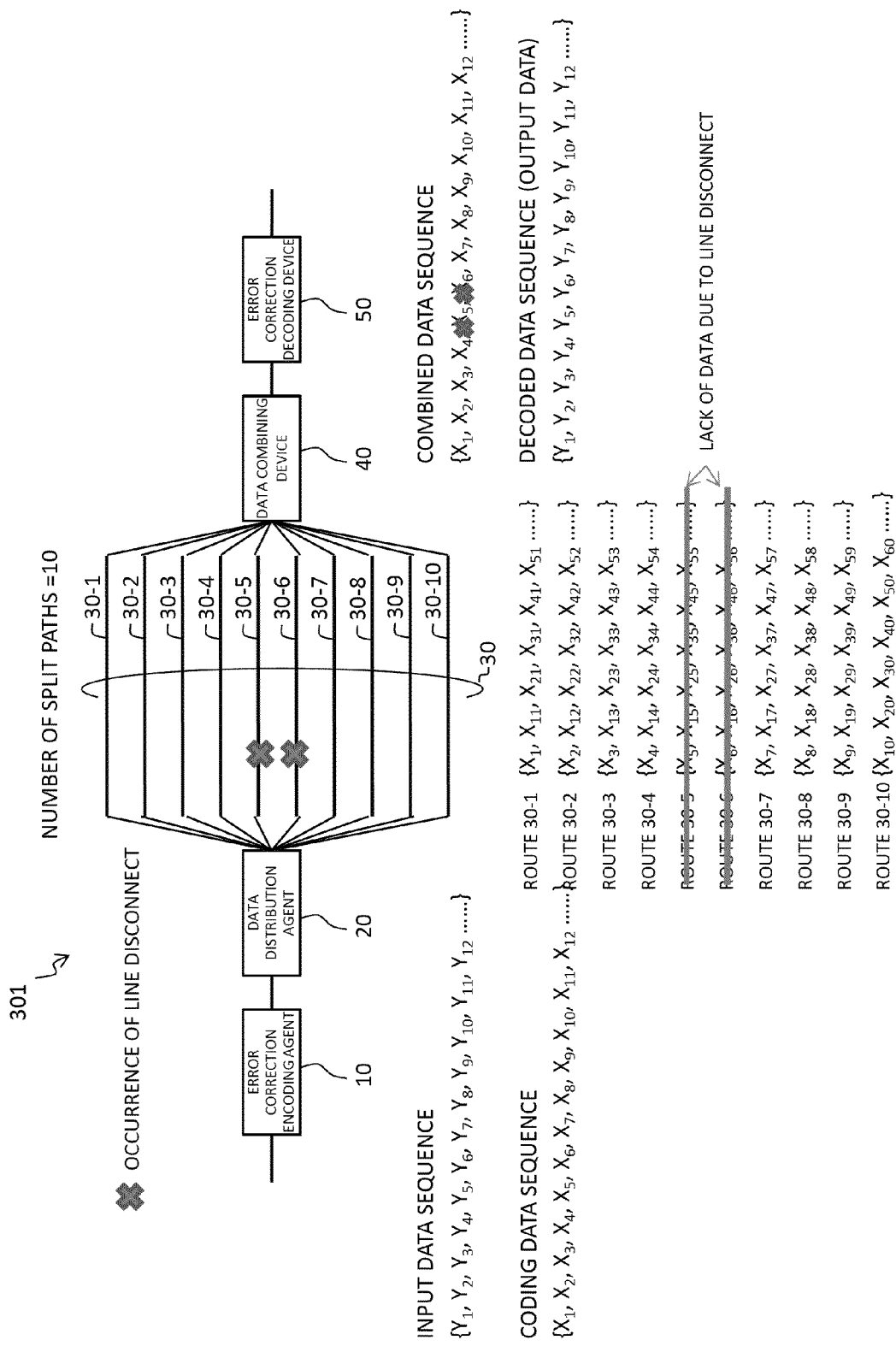
FIG. 14 is a view for explaining an operation of the transmission system according to the present disclosure.

FIGS. 12 to 14 are views for explaining the operation of the transmission system 301. Here, the input data sequence to be input is {y1, y2, . . . }. When the input data sequence is input to the error correction encoding agent 10 shown in the drawings, a redundancy bit is added corresponding to the used error correction code, and the input data sequence is converted into a coded bit sequence {x1, x2, . . . }. In this example, the length of encoded data sequence also increases corresponding to an amount of the redundancy bits to be added.

Encoded data sequence subjected to the error correction coding is input to the next data distribution agent 20. The data distribution agent 20 has a plurality of output ports corresponding to the number of the transmission routes 30 following after the data distribution agent 20. The input coded data sequence is sorted into the output ports different for each bit and output. In FIG. 12, since the number of the transmission routes 30 is 10, the number of the output ports of the data distribution agent 20 is 10. The state of the output coded data sequence is shown in the lower portion of the drawing. As shown here, since the number of the ports is 10, a coded bit sequence {x1, x11, x21, . . . } is distributed in a transmission route 30-1 so as to be circulated every 10 bits, and similarly, a coded bit sequence {x2, x12, x22, . . . } is distributed in a transmission route 30-2. In the same way, in a transmission route 30-$n$, a coded bit sequence {xn, x1n, x2n, . . . } is distributed. In this example, although the degree of splitting of encoded data sequence is set by the number of the transmission routes 30, encoded data sequence may be divided by the degree of splitting set by the agent for configuration 60.

Each of the coded bit sequences output from the interval of the transmission route 30 is input to the data combining agent 40. Here, the number of input ports of the data combining agent 40 is equal to the number of the transmission routes and is 10. In the data combining agent 40, as shown in the drawings, encoded data sequences decentralized in the ten routes are combined again and restored as the coded bit sequence arranged in the original order, that is, the coded bit sequence {x1, x2, . . . }.

FIG. 13 is a view for more specifically explaining the operation of the transmission system 301. In FIG. 13, it is assumed that line-disconnection trouble occurs in a transmission route 30-5. As shown in the drawing, when the transmission route 30-5 is disconnected, the coded bit sequence passing through the transmission route 30-5 is lost. In this case, {x5, x15, x25, . . . } is lost. As a result, since the bit concerned is lacked in encoded data sequence after passing through the data combining agent 40, error may be included in the portion. However, if there is an error of the bit concerned, the error correction decoding agent 50 following after the data combining agent 40 finds and corrects the error. Accordingly, the client is not affected.

As shown in FIG. 14, a transmission route 30-6 is further disconnected, a bit sequence {x6, x16, x26, . . . } is lost. Also in this case, since the error correction code used here can correct the continuous error up to 3 bits, a 2-bit continuous error that may occur in a combined data sequence is completely corrected. Thus, the transmission performance is not affected at all as seen from the client.

For example, in the transmission system 301, the error interval and the continuous error correction can be set as the redundancy of error correction in the agent for configuration 60. The error correction encoding agent 10 and the error correction decoding agent 50 perform the error correction set according to the redundancy of error correction set in the agent for configuration 60. The data distribution agent 20 divides encoded data sequence into the number or more than the number of the error intervals set in the agent for configuration 60.

When an availability of each of the transmission routes 30 is represented by $\gamma$, the error correction performance in the error correction encoding agent 10, that is, a continuous bit number capable of error correction is represented by $\beta$, and the number of split paths is represented by n, an availability $\sigma$ of the entire transmission system of the input data sequence decentralized to the transmission routes and transmitted is given by the following formula:

$$\sigma = 1 - \sum_{k=\beta+1}^{n} {_nC_k}(1-\gamma)^k \gamma^{n+k}$$

In the transmission system in which the availability of each of the transmission routes 30 is $\gamma$, for a certain input data sequence, when the required availability of the entire transmission system is X, the error-correctable continuous bit number $\beta$ and the number of split paths n are selected so that the availability of the entire transmission system obtained by the above formula exceeds or is near X, whereby required reliability can be realized. Even when the values of the availability $\gamma$ of the transmission routes 30 are different from each other, the availability $\sigma$ of the entire transmission system of the input data sequence can be calculated. In this case, a high $\sigma$ can be obtained by preferentially selecting one of the transmission routes, which has a high availability.

Figure 34:
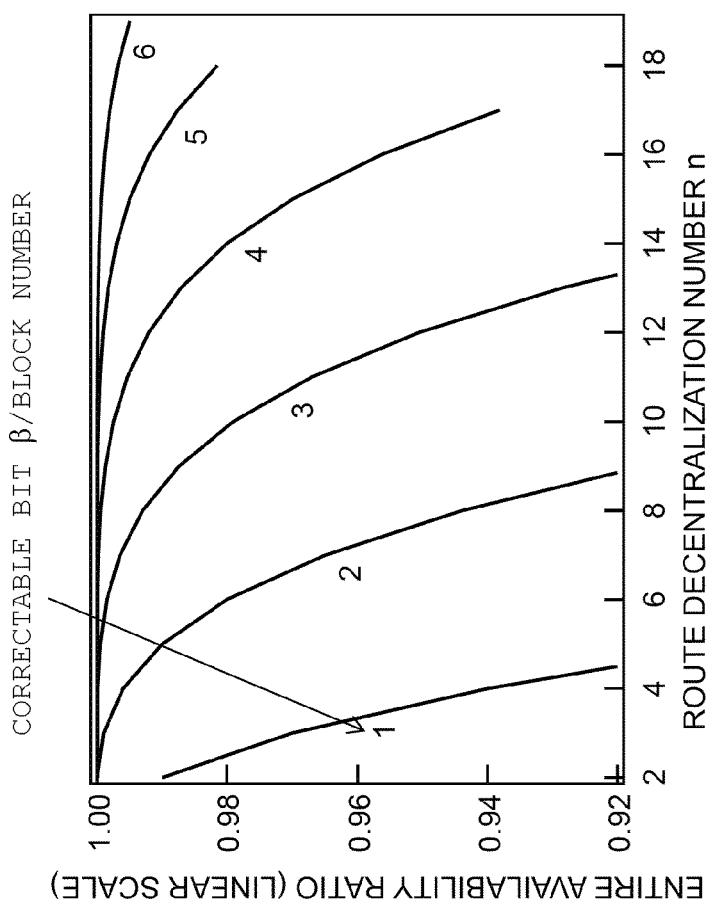
FIG. 34 is a view for explaining a feature of the transmission system according to the present disclosure.

For example, FIG. 34 shows a calculation example when γ=0.9. In the decentralization shown in FIG. 34, the horizontal axis is the number of split paths n, the vertical axis is the availability of the entire transmission system, and a correctable continuous bit number/block number is a parameter. As seen from the drawing, even when the availability of the individual transmission route is so low as γ=0.9, a high value of the availability of the entire transmission system can be realized by suitably selecting the error-correctable continuous bit number β and the number of split paths n.

In the transmission system 301, the redundancy of the error correction and the number of the transmission routes are set in the agent for configuration 60, whereby there can be provided a transmission system, which enables a transfer service with higher reliability, even using a smaller amount of network resources and can flexibly reliability design depending on the application, and a transmission method.

Usual redundancy may be combined with the embodiment of the present application. In the current embodiment, only an active system is considered in terms of the usual redundancy, and a standby system is not considered. Thus, the standby system is added. Namely, the coding redundancy and the degree of splitting as well as multiplicity are added to the redundancy design.

For example, the following case will be considered. It is assumed that original data of three client signals (A, B, and C) corresponding to three blocks are made to correspond to four blocks (A1, A2, A3, and A4) by the error correction coding. In this embodiment, data corresponding to four blocks is divided and transmitted to four routes.

Route 1: A1, B1, C1
Route 2: A2, B2, C2
Route 3: A3, B3, C3
Route 4: A4, B4, C4

Here, the multiplicity is enhanced to enhance the redundancies of A1 to A4.

Route 1: A1, B1, C2, A2
Route 2: A2, B2, C2, A3
Route 3: A3, B3, C3, A4
Route 4: A4, B4, C4, A1

According to this constitution, although the coding redundancy and the degree of splitting in A are the same as those in B and C, the redundancy in A is twice the redundancy.

As described above, by virtue of the use of the "multiplicity", an effect similar to that of a redundancy variable coding method is obtained. Moreover, by the use of the "multiplicity", an effect that the effect of a method of allocating routes can be quantified is obtained. The multiplicity may be applied when the error rates are different for each route.

For example, when only the error rate in the route 4 is twice the error rates of other routes, the following case is considered.

Route 1: A1, B1, C1
Route 2: A2, B2, C2
Route 3: A3, B3, C3
Route 4: A4, B4, C4, A4, B4, C4

Thus, it is possible to correspond to the case where the error rates are different for each route. As described above, there is an effect that route selection redundancy design corresponding to the error rate can be performed.

In this case, the multiplicity is set at a substantially reciprocal ratio of the error rate according to the error rate for each route. Even when the multiplicity in all the routes is 1, a similar effect is obtained by allocating the degree of splitting to each route so as to provide the substantially reciprocal ratio of the error rate according to the error rate for each route.

For example, when only the error rate of the route 4 is twice the error rates of other routes and the degree of splitting is five, the following case is considered.

Route 1: A1, B1, C1
Route: A2, B2, C2
Route 3: A3, B3, C3
Route 4: A4, B4, C4, A5, B5, C5

Thus, there is an effect that it is possible to correspond to the case where the error rate is different for each route.

Embodiment 2

A transmission system 302 of an embodiment 2 corresponds to the transmission system 301 provided with a multiplexing agent 70 which makes encoded data sequences, propagating the respective transmission routes 30, a data sequence in which data sequences based on the input data sequences from a plurality of clients are multiplexed, and a separation agent 80 which separates encoded data sequences, propagating the respective transmission routes 30, for each data sequence based on the input data sequences from the clients.

Figure 2:
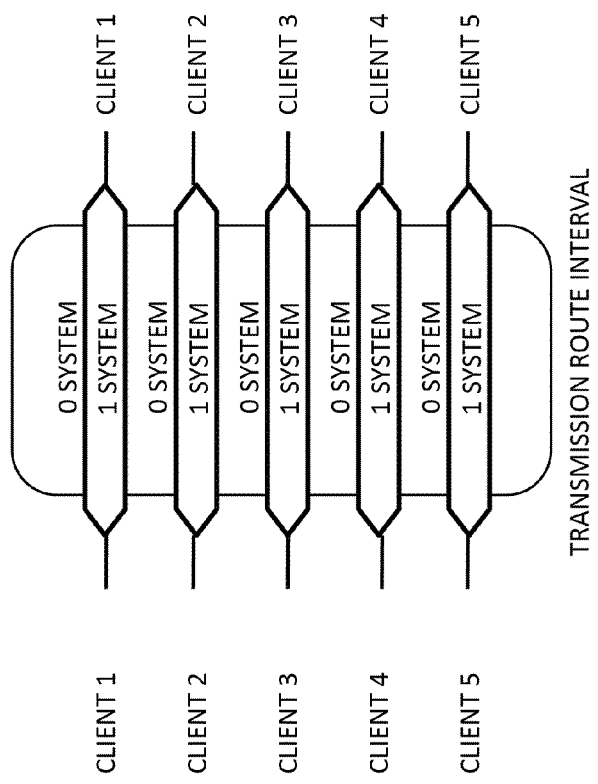
FIG. 2 is a view for explaining the conventional transmission system.

Explanation of comparison between the transmission system 302 and the conventional art is added. In this comparison, it is considered that the input data sequences from five clients are transmitted through the ten transmission routes 30. A realization example according to the conventional art is shown in FIG. 2. In this example, every two of ten routes are paired to provide a 1+1 configuration, and the stress proof against a single failure is realized. If a bandwidth of the single route is 1 Gbps, the bandwidth corresponding to 5 Gbps can be used as a whole. Namely, when an available bandwidth and the reliability are taken as performance indexes, acquisition of a resistance to the single failure with respect to the five clients in the 1 Gbps bandwidth is realized by the conventional art.

Figure 8:
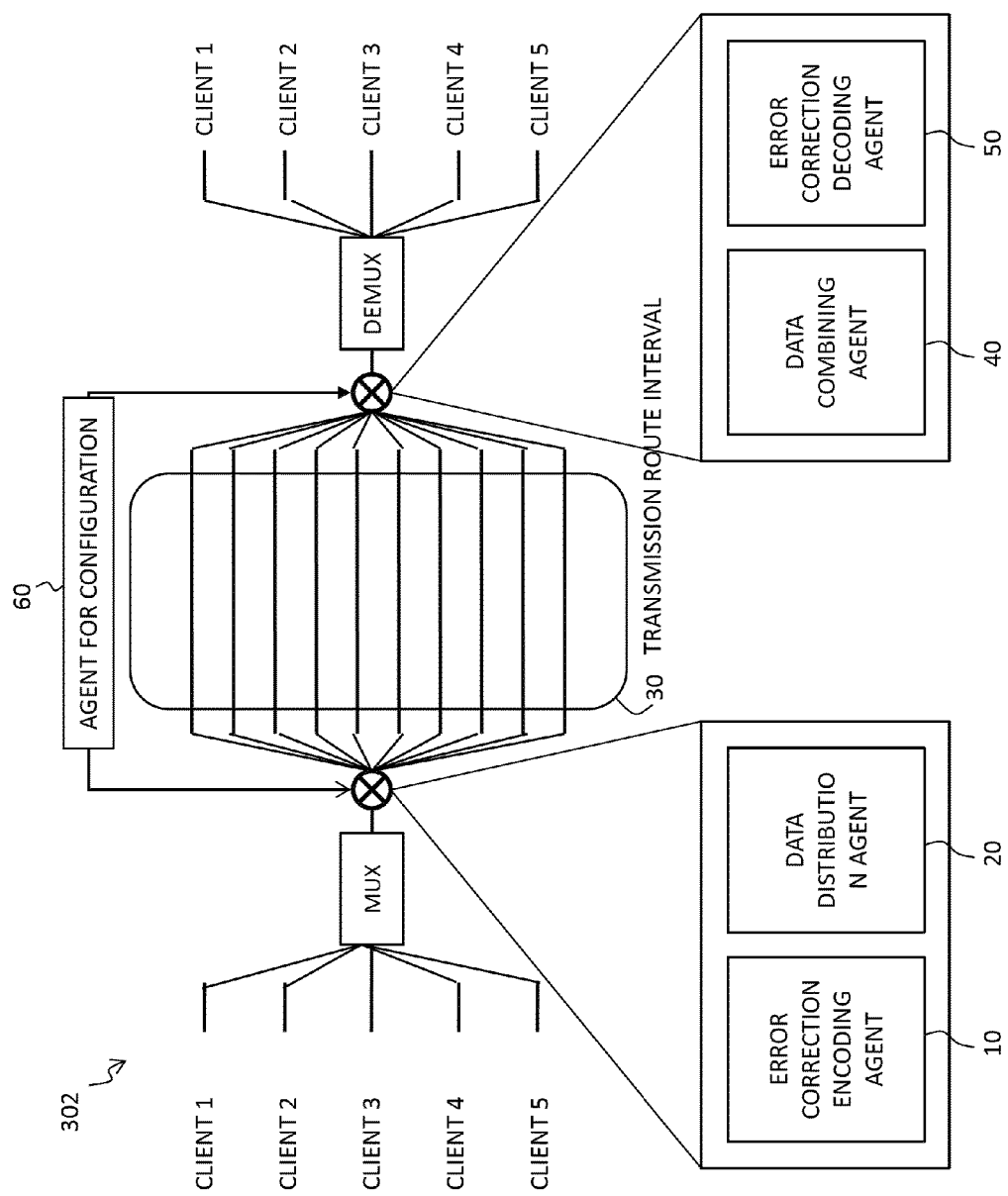
FIG. 8 is a view for explaining the transmission system according to the present disclosure.

A configuration of the transmission system 302 is shown in FIG. 8. In this case, signals from the five clients are collected by the multiplexing agent 70 to be subjected to error correction coding processing, and, thus, to be decentralized to the plurality of transmission routes 30 by the data distribution agent 20.

In this case, as in the embodiment 1, the number of the correctable error intervals of the error correction code used by the error correction decoding agent 10 and the error correction decoding agent 50 is 10, and the continuous error up to 3 bits can be corrected. Although the redundancy used in this case is different depending on the error correction code to be used, it is considered that the convolution code and the like having a coding ratio of 2/3, six memories, and a constraint length of 4 can be used for example (for example, see Non-Patent Literature 2). Namely, the redundancy is 1.5 in this case, and it is sufficient to be 1.5 Gbps for a signal of 1 Gbps. In the transmission system 302, since the ten routes in a 1-Gbps bandwidth are provided, a transmission bandwidth in which 10÷1.5 (redundancy)=6.6 Gbps can be secured up to a triple failure. If the number of the clients is five, it is 1.3 Gbps per one client.

According to the above comparison, in the conventional art, when five 1-Gbps clients are contained using ten 1-Gbps routes, although it is possible to correspond to only the single failure, the transmission system 302 can correspond to respective triple failures in the five clients more than 1 Gbps (here, 1.3 Gbps). In the transmission system 302, the transfer in a wider bandwidth can be realized with higher reliability even in the same network resources.

Figure 15:
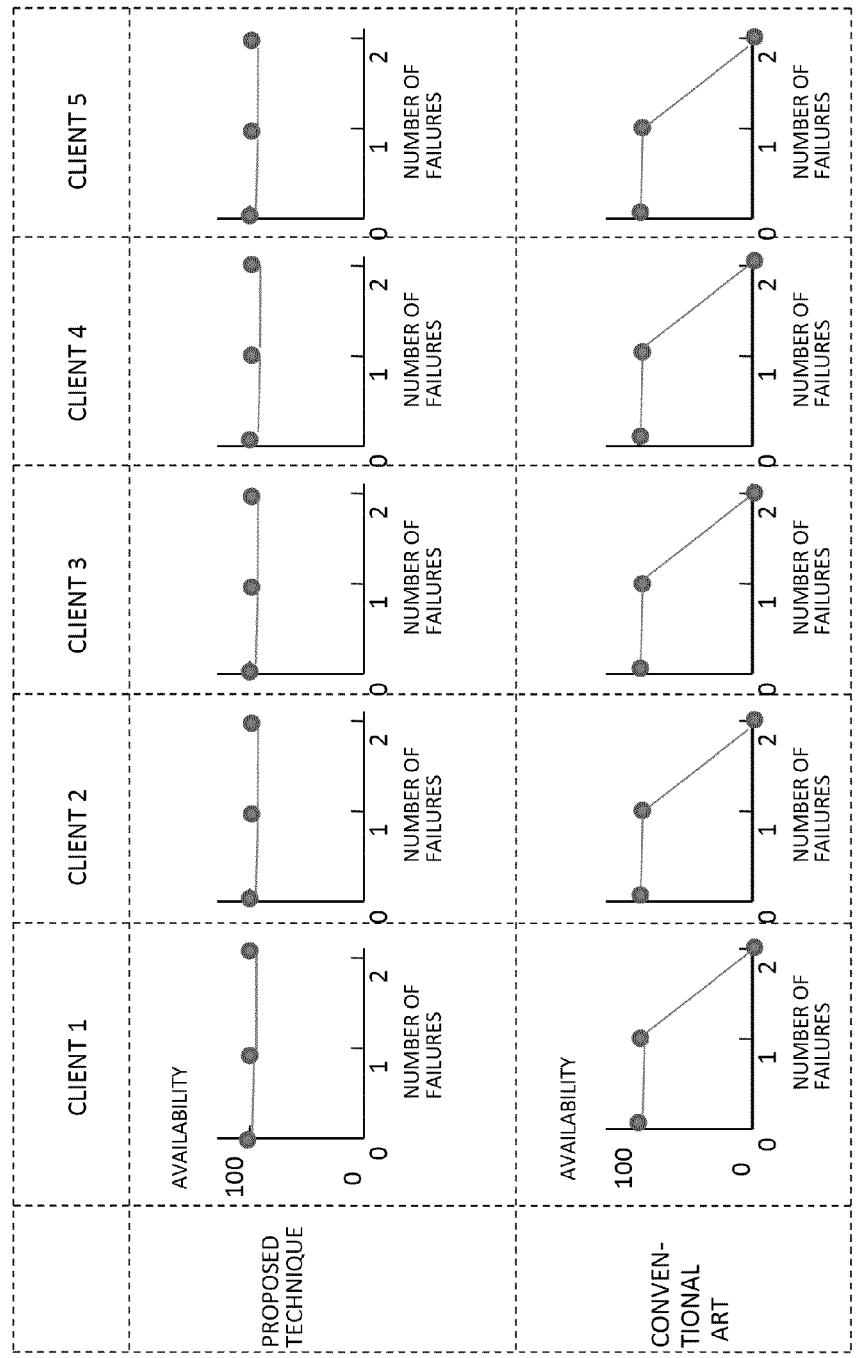
FIG. 15 is a view for explaining a comparison between the transmission system according to the present disclosure and the conventional transmission system.
Figure 16:
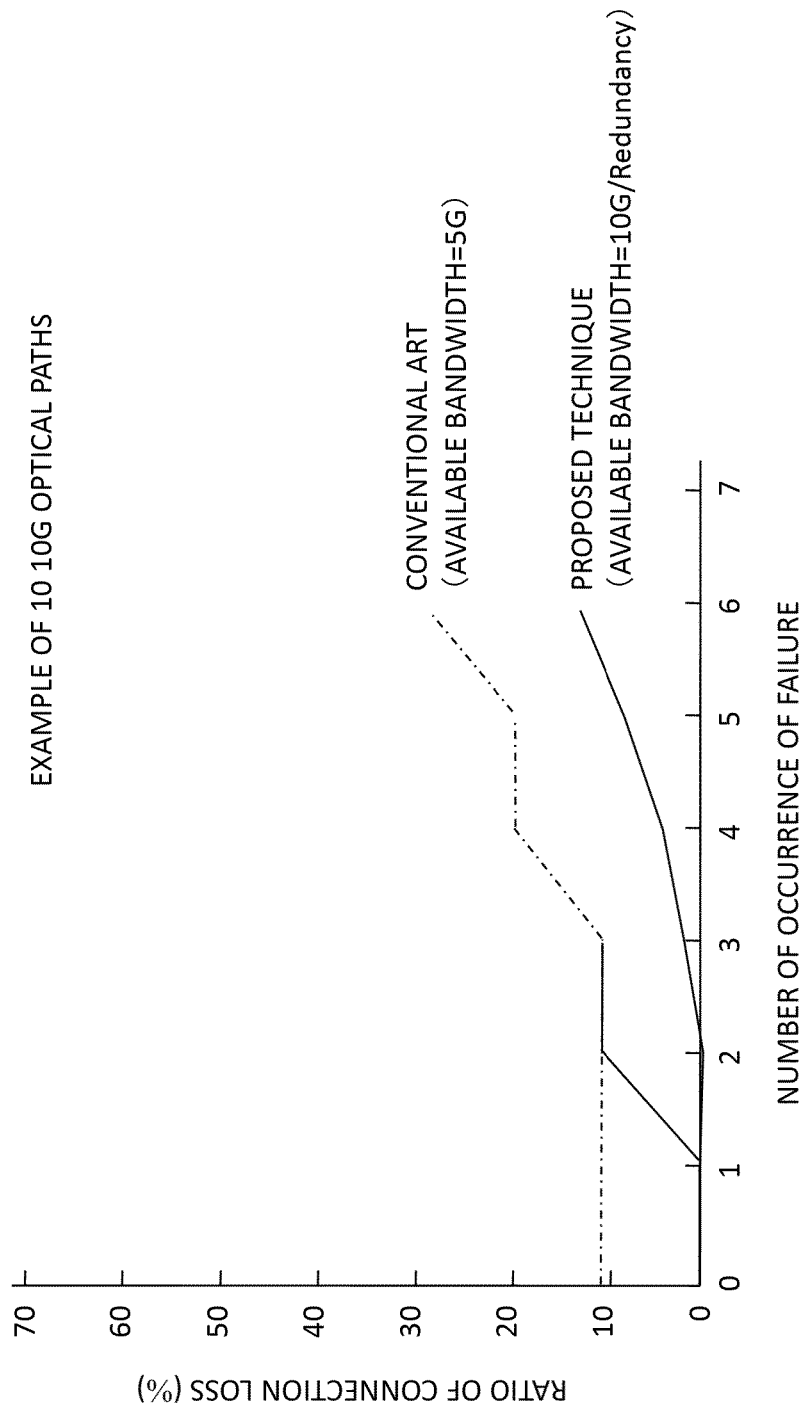
FIG. 16 is a view for explaining a comparison between the transmission system according to the present disclosure and the conventional transmission system.

The above description is summarized in FIG. 15. In the conventional art, as shown in the lower stage of FIG. 15, there is generated a client disconnected completely with a certain probability when a double failure occurs. Meanwhile, in the transmission system 302, as shown in the upper stage of FIG. 15, the transfer performance is not lost at all even when the double failure occurs. The contents of FIG. 15 are shown in graphical form in FIG. 16. In the transmission system 302, a large bandwidth can be realized with a small connection loss rate in comparison with the conventional art.

Figure 10:
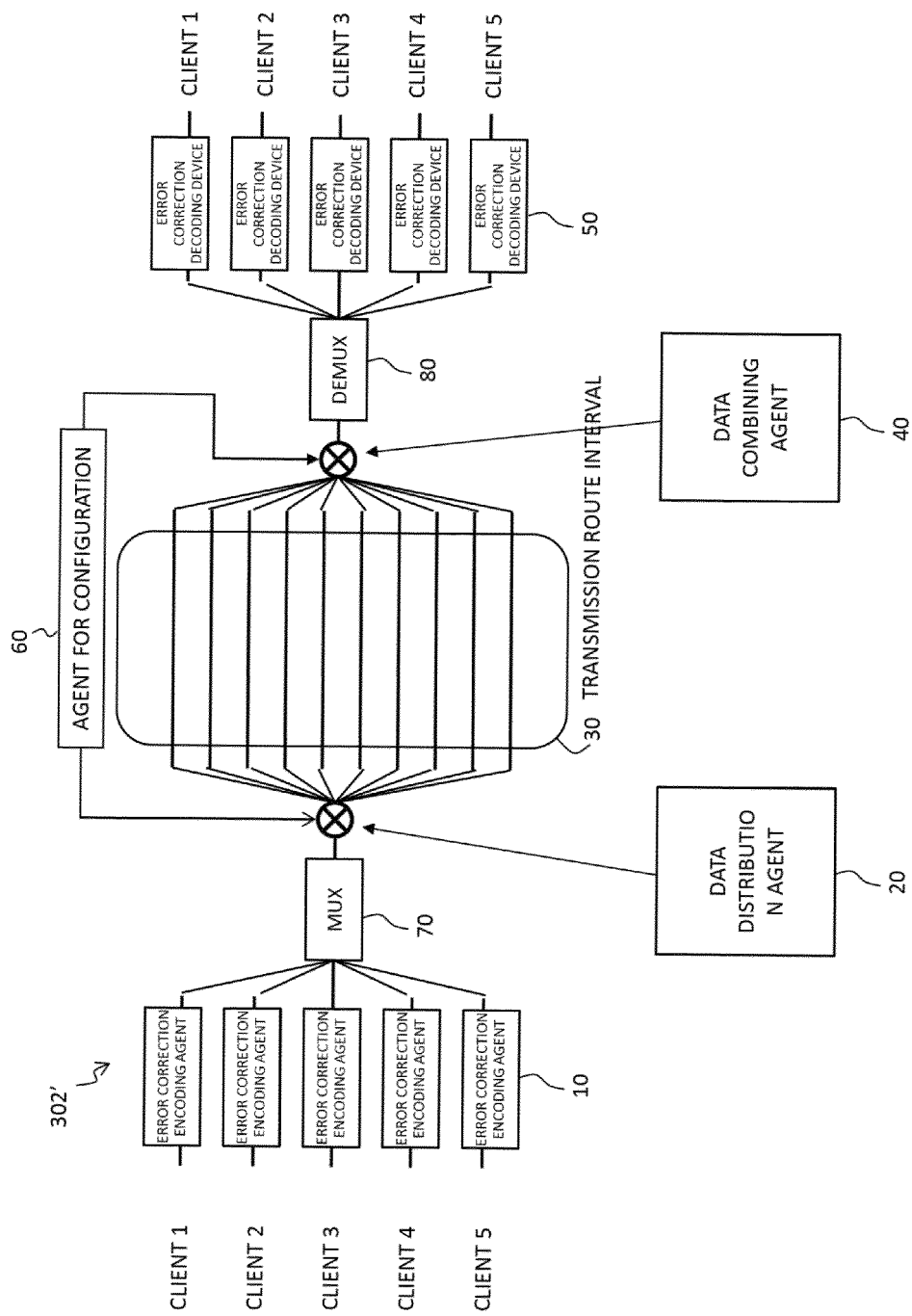
FIG. 10 is a view for explaining the transmission system according to the present disclosure.
Figure 11:
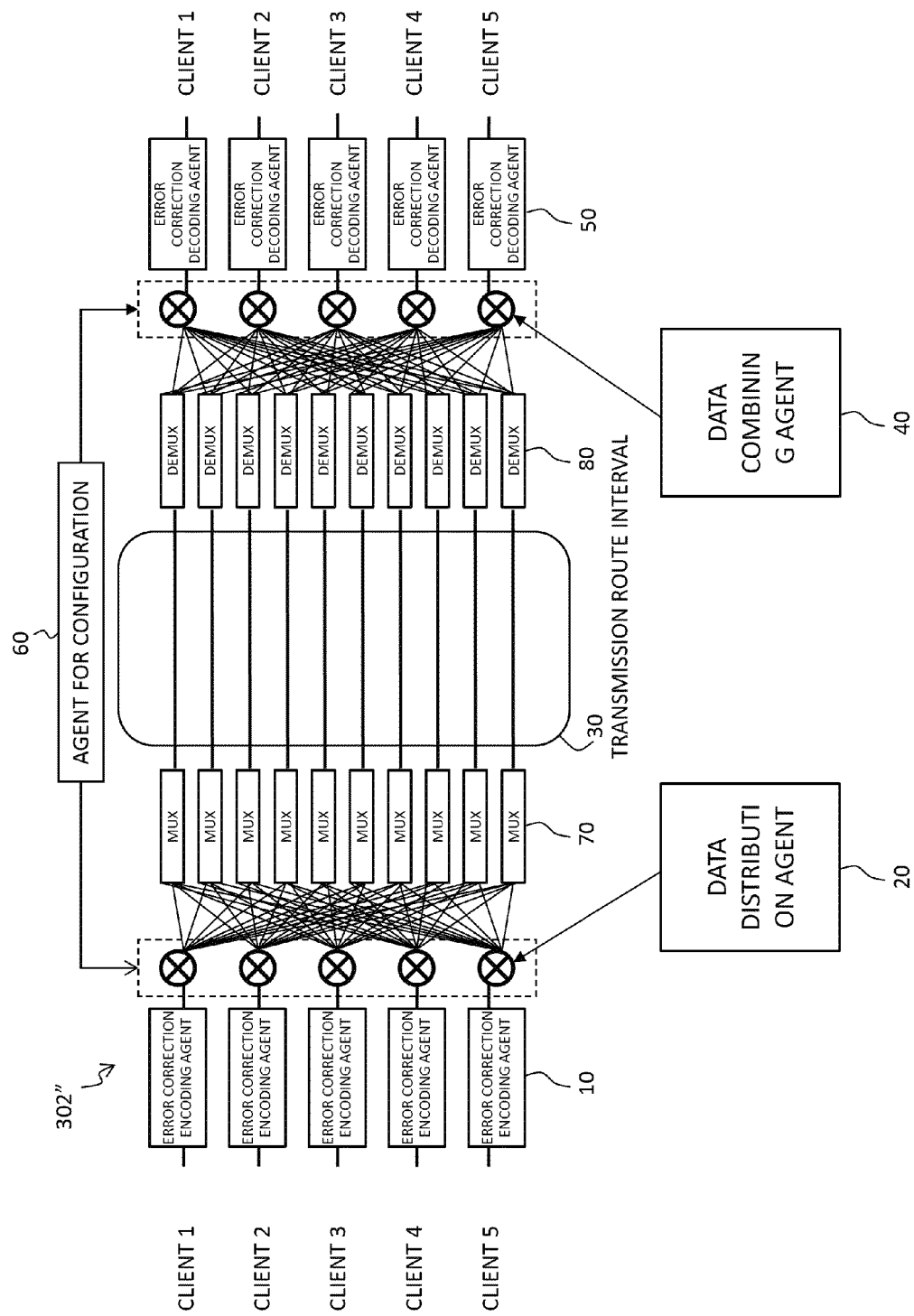
FIG. 11 is a view for explaining the transmission system according to the present disclosure.

As other examples of the embodiment 2, a transmission system 302' is shown in FIG. 10, and a transmission system 302" is shown in FIG. 11. In the transmission system 302', the input data sequences from the clients are made encoded data sequences by the error correction encoding agent 10, encoded data sequences are multiplexed by the multiplexing agent 70, and the multiplexed coded data sequence is divided by the data decentralization devise 20 to be input to the transmission routes 30.

In the transmission system 302', the data combining agent 40 collects outputs from the intervals of the transmission route 30, the separation agent 80 then separates the multiplexed coded data sequence, and the error correction decoding agent 50 restores the separated coded data sequences to the original input data sequence from the client.

The following two examples are exemplified as a method of decentralizing encoded data sequence of each client to the transmission routes:
(1) the multiplexing agent 70 time-division multiplexes encoded data sequence for each client, and the data distribution agent 20 sorts the time-division multiplexed coded data sequences into different routes in the timing.
(2) the multiplexing agent 70 puts identification information of each client in encoded data sequence and multiplexes encoded data sequences, and the data distribution agent 20 sorts the data sequences into different routes in the accordance with the identification information.

In the transmission system 302" of FIG. 11, the input data sequences from the clients are made encoded data sequences by the error correction encoding agent 10, the respective coded data sequences are separated to the transmission routes 30 by the data distribution agent 20, and the client's coded data sequences different for each of the transmission routes 30 are multiplexed by the multiplexing agent 70 to be output to each transmission route 30.

In the transmission system 302", encoded data sequences output from the intervals of the transmission routes 30 is separated for each client by the separation agent 80, encoded data sequences are collected for each client by the data combining agent 40, the decoded data sequences output from a plurality of the data combining agent 40 are subjected to error correction decoding by the error correction decoding agent 50, and the original client's input data sequence is restored.

In the transmission system 302", the data distribution agent 20 and the data combining agent 40 are independent for each client, and the multiplexing agent 70 and the separation agent 80 are independent for each of the transmission routes 30, so that high proof stress against a failure of the data distribution agent 20 and the data combining agent 40 and a failure of the multiplexing agent 70 and the separation agent 80 can be realized.

In the transmission system 302, transmission system 302' and transmission system 302", in comparison with a conventional method in which a copy of an original signal is decentralized to a plurality of routes and transmitted, similar reliability can be realized with smaller resources. Further higher reliability can be easily realized with smaller resources, thus making it possible to contribute to economical realization of high reliability service.

Figure 9:
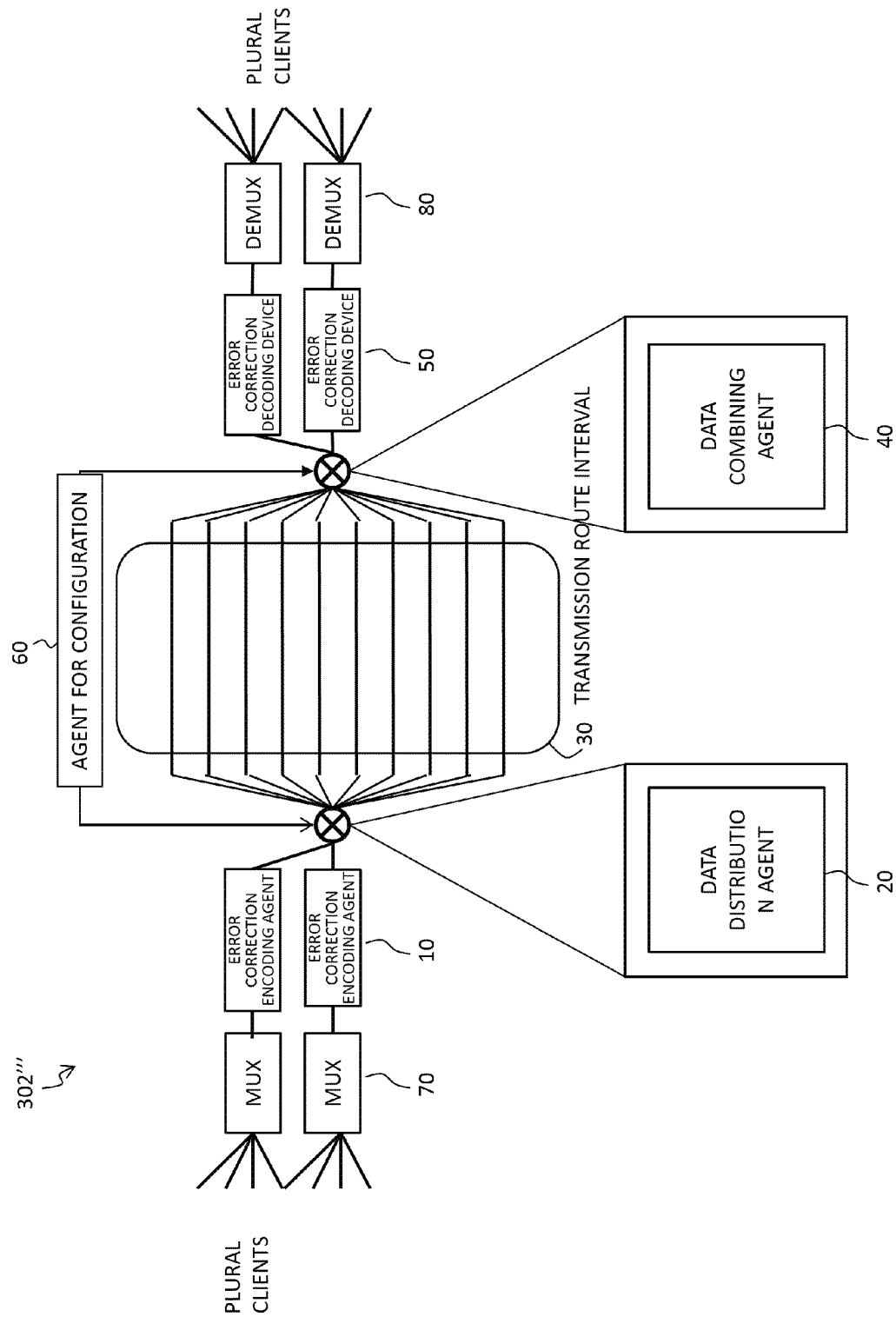
FIG. 9 is a view for explaining the transmission system according to the present disclosure.

As another example of the embodiment 2, a transmission system 302''' is shown in FIG. 9. As shown in FIG. 9, different kinds of error correction coding are applied not for each client but for each group of a certain client, whereby different redundancies and reliabilities can be realized for each coherent group of the clients. In this embodiment, as shown in FIG. 9, among the input data sequences from the clients, the input data sequences requiring the same reliability are collected and input to the multiplexing agent 70. Multiplexed signals output from the multiplexing agent 70 are input to the error correction encoding agent 10. At this time, in the error correction encoding agent 10, a degree of redundancy is set according to the required reliability. After that, as in the previous embodiment, in the data distribution agent 20, the data sequences subjected to the error correction coding are discretely arranged in the route intervals. The signals from plurality of the routes are collected in the data combining agent 40 and input to the error correction decoding agent 50 for each group. After that, an original client signal is restored in the separation agent 80. Thus, when there is a plurality of clients requiring the same reliability, the transmission system can be configured efficiently.

Embodiment 3

A transmission system 303 of an embodiment 3 corresponds to the transmission system 302 is further provided with data for time sequence control input agent 90 which, with regard to encoded data sequences divided by the data distribution agent 20, adds data for time sequence control, specifying a temporal position before combination with the transmission route 30, to each of the divided coded data sequences and agent for relative delay compensation 100 which absorbs a delay difference in each of the transmission routes 30 of the divided coded data sequences with reference to the data for time sequence control added by the data for time sequence control input agent 90 and inputs the delay difference to the data combining agent 40.

Figure 7:
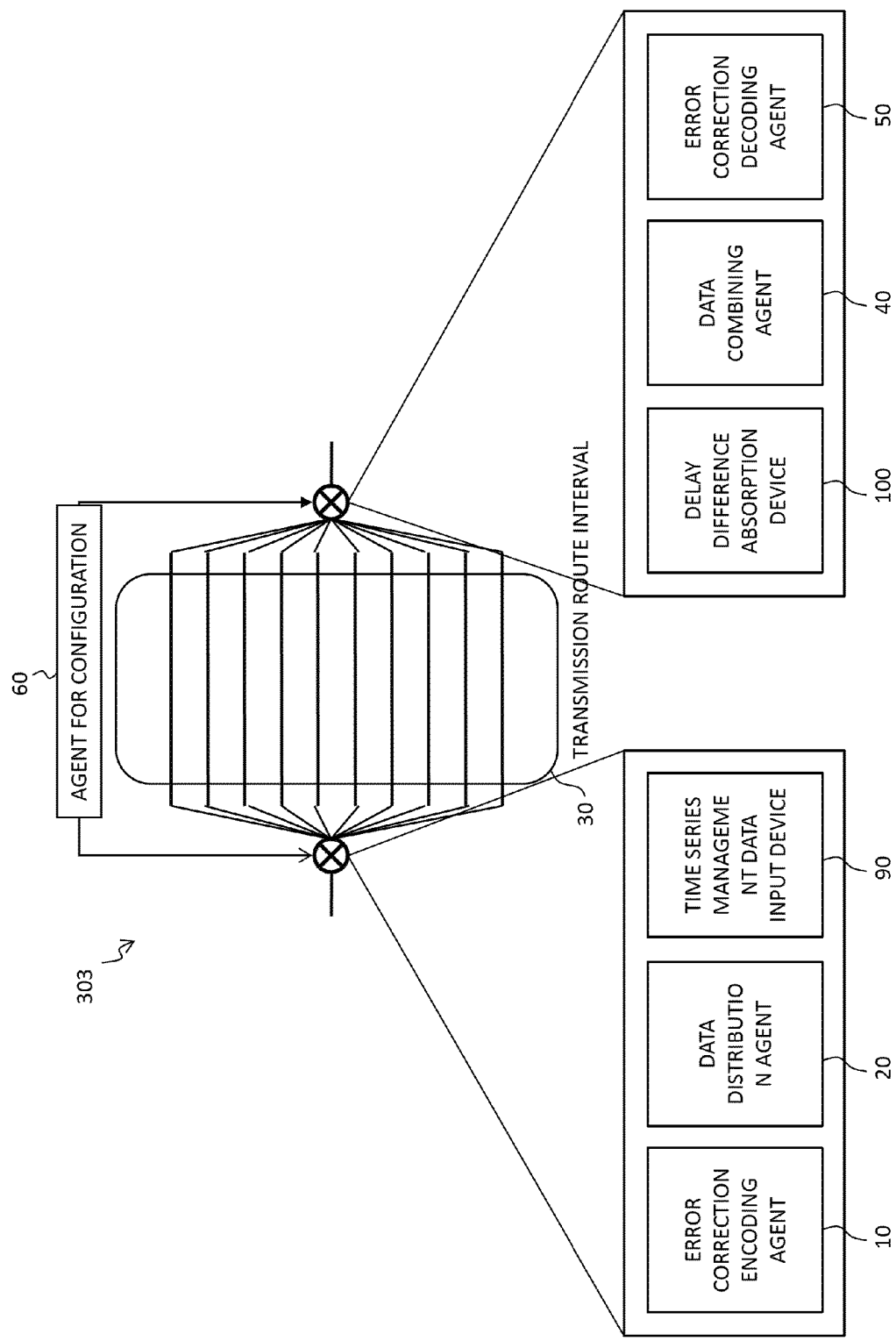
FIG. 7 is a view for explaining the transmission system according to the present disclosure.

FIG. 7 is a view for explaining the transmission system 303. Although the operation of the transmission system 303 is the same as the operation of the transmission system 301, the transmission system 303 is provided with the data for time sequence control input agent 90 and the error correction encoding agent 100, and the delay difference between decentralized signal sequences is absorbed, and in the output of the data combining agent 40, a data sequence before passing through the data distribution agent 20 can be accurately restored.

As described above, in the transmission system 303, even when the lengths and delay amounts of the intervals of the transmission route 30 are different from each other, a normal operation of the post stage of the error correction decoding agent 50 can be realized by an effect of relative delay compensation using the data for time sequence control.

Embodiment 4

A transmission system 304 of an embodiment 4 corresponds to the transmission system 301 to transmission system 303 is further provided with control agent 110 which sets encoded data sequence in the redundancy in the error correction encoding agent 10 and the degree of splitting of encoded data sequence in the data distribution agent 20 in the agent for configuration 60 for each client.

Figure 17:
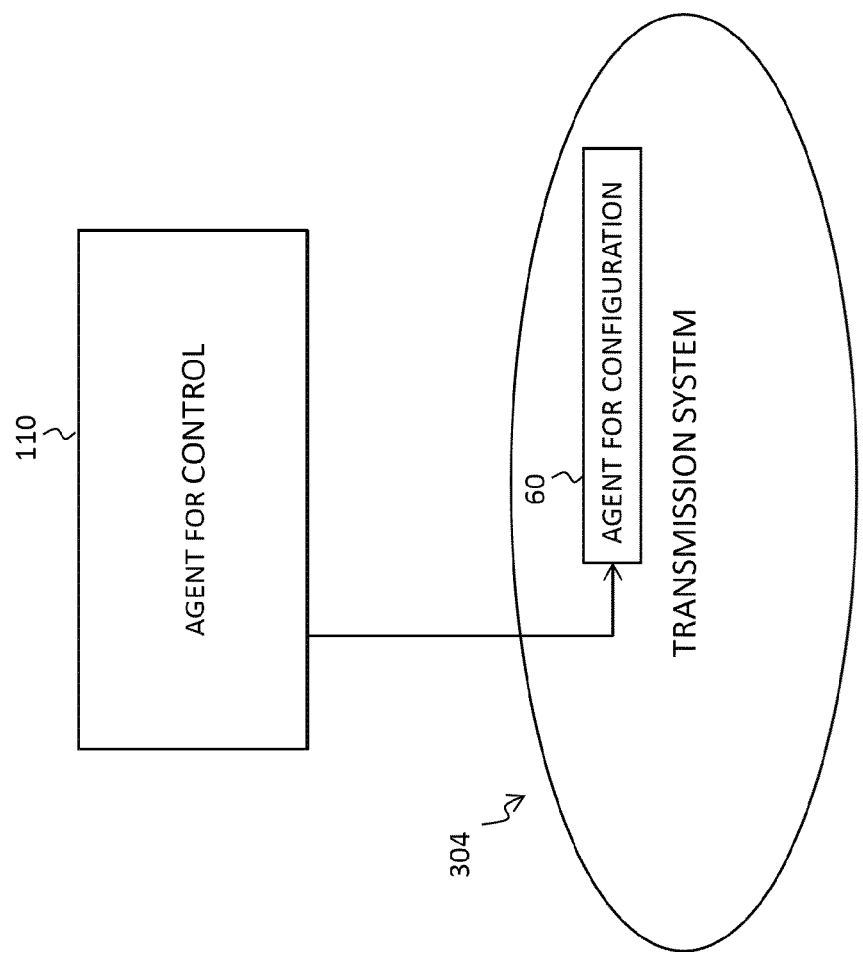
FIG. 17 is a view for explaining an operation of the transmission system according to the present disclosure.

FIG. 17 is a view for explaining the transmission system 304. The transmission system 304 sets kinds of error correction codes used according to desired reliability in the control agent 110 or a required number of the transmission routes in the agent for configuration 60. For example, when a resistance against the triple failure is required, the error correction code capable of correction up to a 3-bit continuous error is selected, and, at the same time, a transmission interval route number is set so that the selected error correction code is a correctable error interval or more than the correctable error interval.

The transmission system 304 not only has high proof stress for a failure in the interval of the transmission route 30, but also selects each independent error correction code with respect to a digital signal from the plurality of clients, and sets the decentralization number to the transmission route, whereby the reliability can be independently set to each client.

Embodiment 5

The present embodiment is an example in which the transmission system 301 described in the embodiment 1 uses the block code as the error correction code. In this embodiment, a "predetermined processing unit" used when the data distribution agent 20 decentralizes the data sequence has a length of one period of the divided data sequence, that is, a length corresponding to a complete circuit through all the transmission routes in the sequential decentralization to each of the transmission routes 30. The predetermined processing unit is a code word length of the error correction code using the error correction encoding agent 10 and the error correction decoding agent 50 or more than the code word length, or the interleave length or more than the interleave length.

When setting is performed as above, if an arbitrary transmission route of the transmission routes 30 is failed in the transmission system 301, error due to the route concerned appears only once per correction unit of the error correction code used in the error correction encoding agent 10 and the error correction decoding agent 50, and complete correction can be performed.

Embodiment 6

The present embodiment is another example in which the transmission system 301 described in the embodiment 1 uses the convolution code as the error correction code. In this embodiment, the "predetermined processing unit" decentralized in the data distribution agent 20 has the length corresponding to a complete circuit through all the transmission routes in the sequential decentralization of the bit sequences to each of the transmission routes 30. The predetermined processing unit is smaller than the burst error proof stress of the error correction code used in the error correction encoding agent 10 and the error correction decoding agent 50.

When setting is performed as above, if an arbitrary transmission route of the transmission routes 30 is failed in the transmission system 301, an error due to the route concerned is contained in the burst error proof stress of the error correction code used in the error correction encoding agent 10 and the error correction decoding agent 50, and complete correction can be performed.

In the embodiment 1, embodiment 5, and embodiment 6, the predetermined processing unit used when the transmission system 301 uses the convolution code as the error correction code and the predetermined processing unit used when the transmission system 301 uses the block code as the error correction code have been described. As described in the embodiment 4, the control agent 110 sets, for each client, whether the convolution code or the block code is used as the error correction code, and the predetermined processing unit is accordingly set for each client.

Embodiment 7

Figure 18:
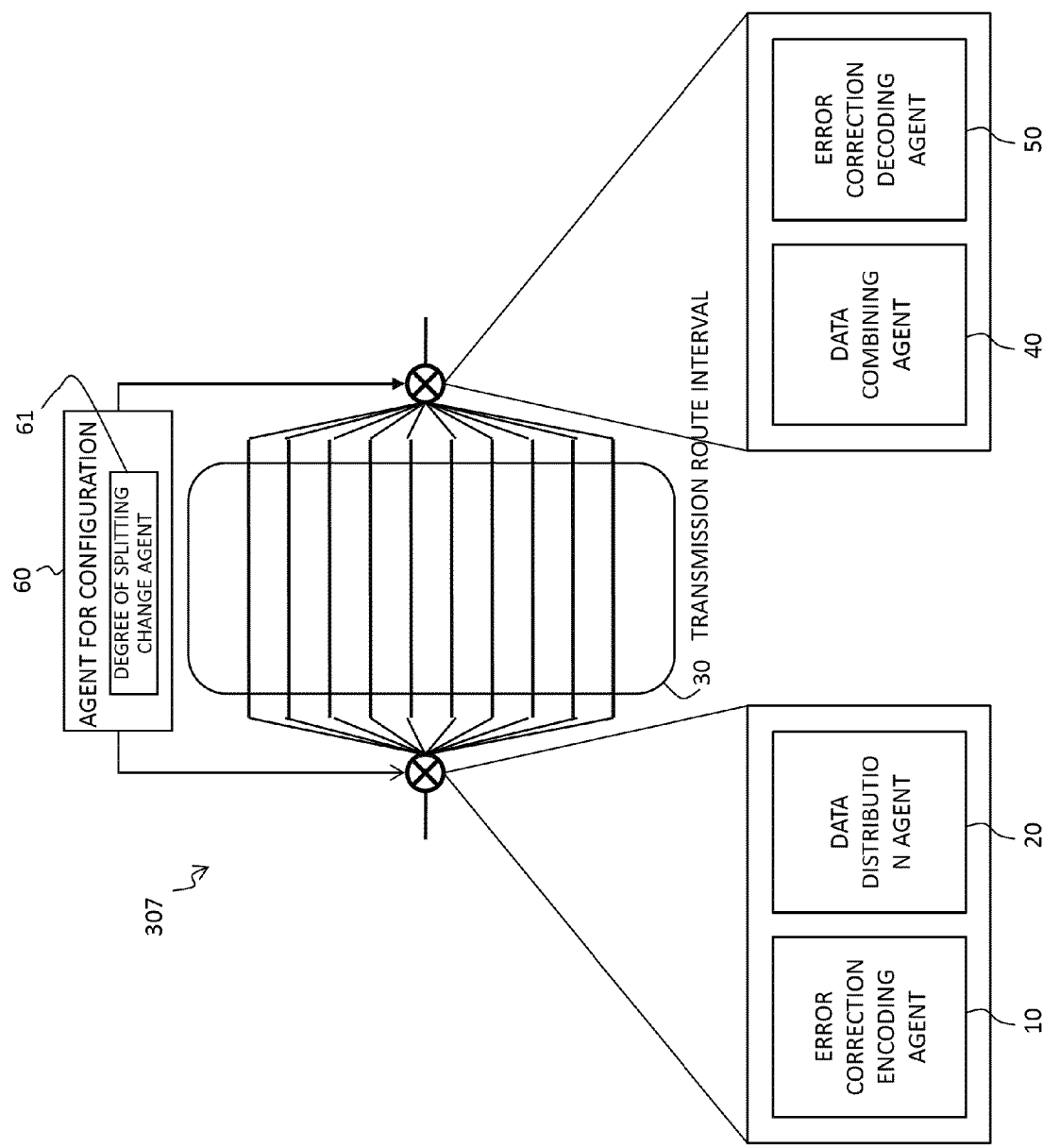
FIG. 18 is a view for explaining an operation of the transmission system according to the present disclosure.

A transmission system of an embodiment 7 corresponds to the transmission system 301 to transmission system 303 in which the agent for configuration changes the degree of splitting of encoded data sequence. FIG. 18 is a view for explaining a transmission system 307. The agent for configuration 60 of the transmission system 307 is provided with a degree of splitting change agent 61 which changes the degree of splitting of encoded data sequence.

Figure 19:
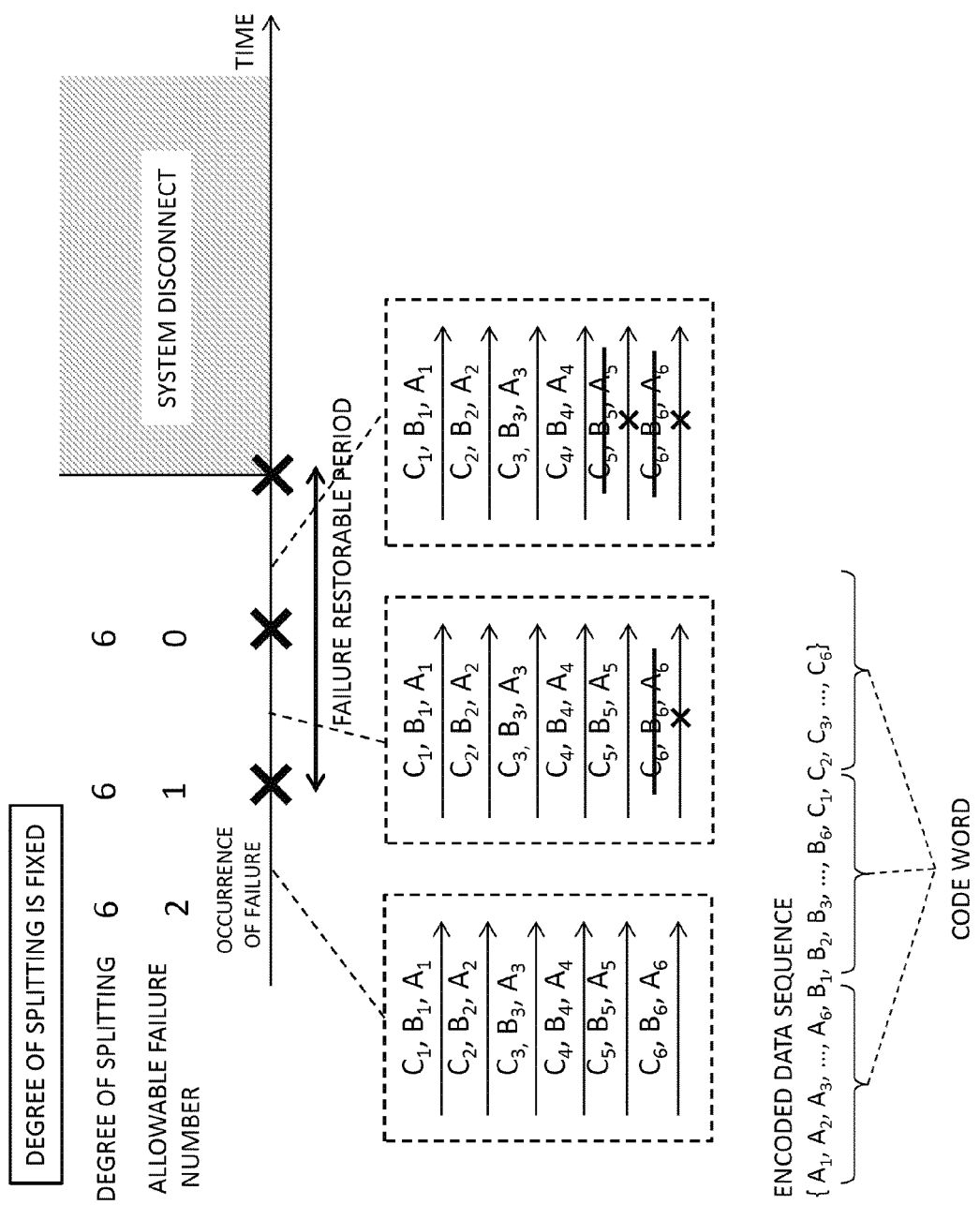
FIG. 19 is a view for explaining an operation of the transmission system according to the present disclosure.
Figure 20:
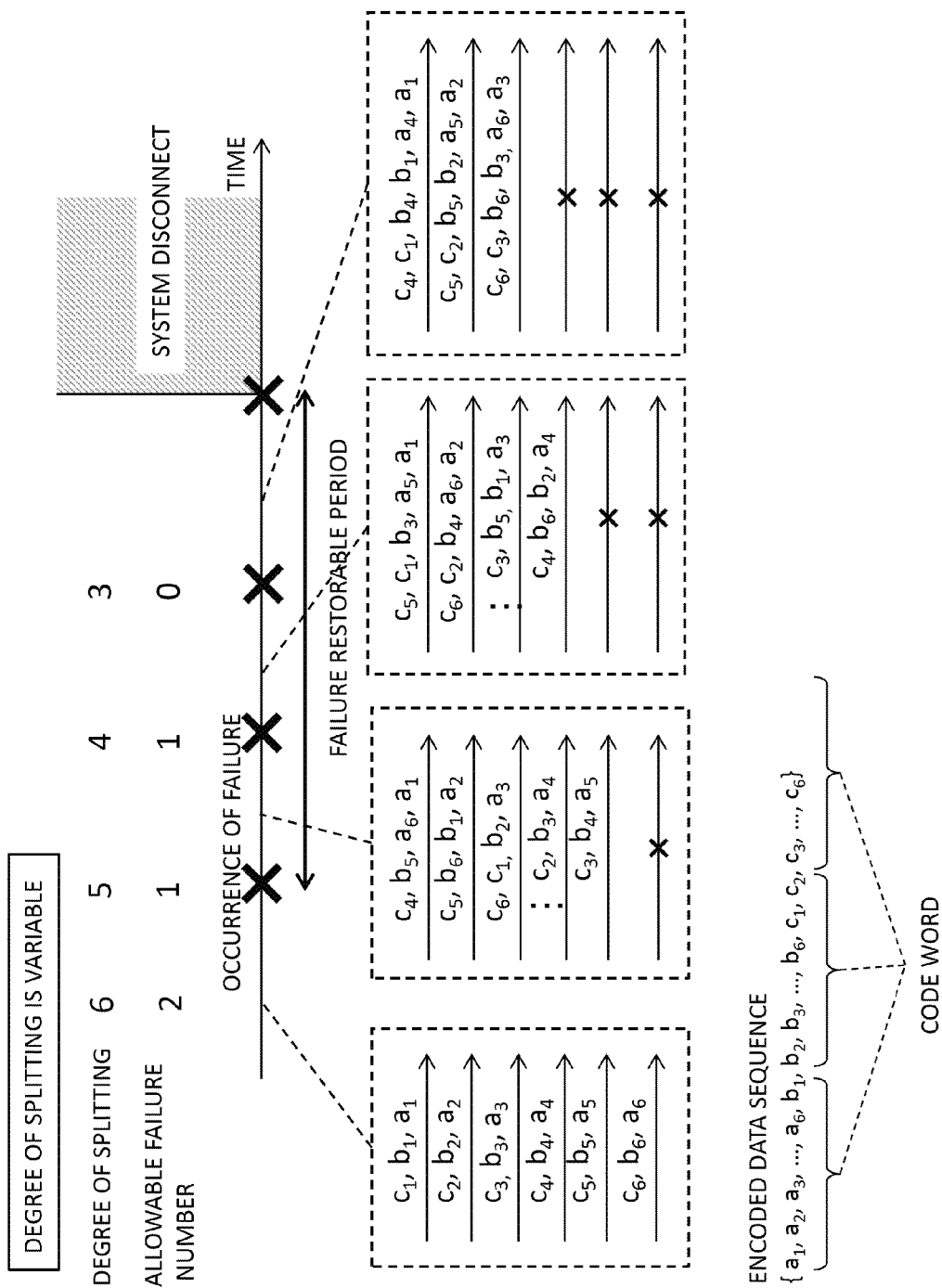
FIG. 20 is a view for explaining an operation of the transmission system according to the present disclosure.

FIG. 19 and FIG. 20 are views for explaining an application effect of the degree of splitting change agent 61. In FIG. 18 and FIG. 20, the agent for configuration 60 is provided with degree of splitting changing agent which changes the degree of splitting of encoded data sequence. First, in a case where the degree of splitting is fixed, a relation between the degree of splitting, the transmission bandwidth, and allowable failure number for each occurrence of a transmission route failure is shown in FIG. 19. The allowable failure number is assumed to represent the maximum number of the transmission routes that allows system disconnection to be prevented by restoration of information using the redundancy even if a failure occurs. As an example of the error correction code to be used, a lost correction Reed Solomon code having a code length of 6 and a data length of 4 is shown. When encoded data sequence is sent while being decentralized in the transmission routes different for each symbol constituting the code, encoded data sequence can be decoded with respect to up to two transmission route failures. As shown in FIG. 19, when the degree of splitting is fixed with respect to the occurrence of the transmission route failure, the allowable failure number is reduced for each occurrence of the transmission route failure. When the transmission route failure occurs in such a state that the allowable failure number is 0, the system disconnection occurs. The time from an initial occurrence of the transmission route failure to the system disconnection is a failure restorable period, and when failure restoration can be performed during the period, the system disconnection can be prevented. In the case shown in FIG. 19, the period corresponds to the time for three transmission routes to be failed. In this embodiment, the degree of splitting change agent 61 is not required. Since the setting of the transmission system is not required to be changed until reaching the system disconnection, the maintenance burden is suppressed.

Meanwhile, when the degree of splitting change agent 61 is provided, the degree of splitting is reduced with respect to the occurrence of the transmission route failure, whereby while the reduction of the allowable failure number is suppressed, an operation method with a high system operating ratio can be realized. In a case of performing operation in which the degree of splitting is reduced in the same environment as FIG. 19, the relation between the degree of splitting, the transmission bandwidth, and the allowable failure number for each occurrence of a transmission route failure is shown in FIG. 20. In this case, the degree of splitting is reduced when the transmission route failure occurs, and data to be normally transmitted to the transmission route in which the transmission route failure occurs is sorted into another transmission route. In FIG. 20, as a method of sorting data, although the data are sorted into normal transmission routes in a round-robin manner in order of the data sequence, any sorting method may be used. Thus, the degree of splitting is reduced with respect to the occurrence of the transmission route failure, and a large amount of data is allocated in normal transmission routes, whereby the system operating ratio is enhanced, and the failure restorable period can be extended. In the example shown in FIG. 20, the failure restorable period corresponds to the time for four transmission routes to be failed. The extension of the failure restorable period is effective as handling to secure minimum connectivity in a case where the maintenance burden is very enhanced by occurrence of disasters, for example. The change of degree of splitting does not depend on the timing of the occurrence of a failure and can be performed in any period as long as the period is in the failure restorable period.

In the present embodiment, the degree of splitting not only is reduced as shown in FIG. 20 but also can be increased. For example, the degree of splitting is temporarily reduced when a fault occurs, and thereafter the degree of splitting in a transmission system may be restored by restoring the transmission route, and the degree of splitting may be increased in order to enhance the reliability of the transmission system in the usual operation in which the transmission route failure does not occur.

The degree of splitting can be changed by using the data distribution agent which can dynamically change the degree of splitting or by providing plural data distribution agents with different degree of splitting and switching the data distribution agent with the use of a selector.

Embodiment 8

Figure 22:
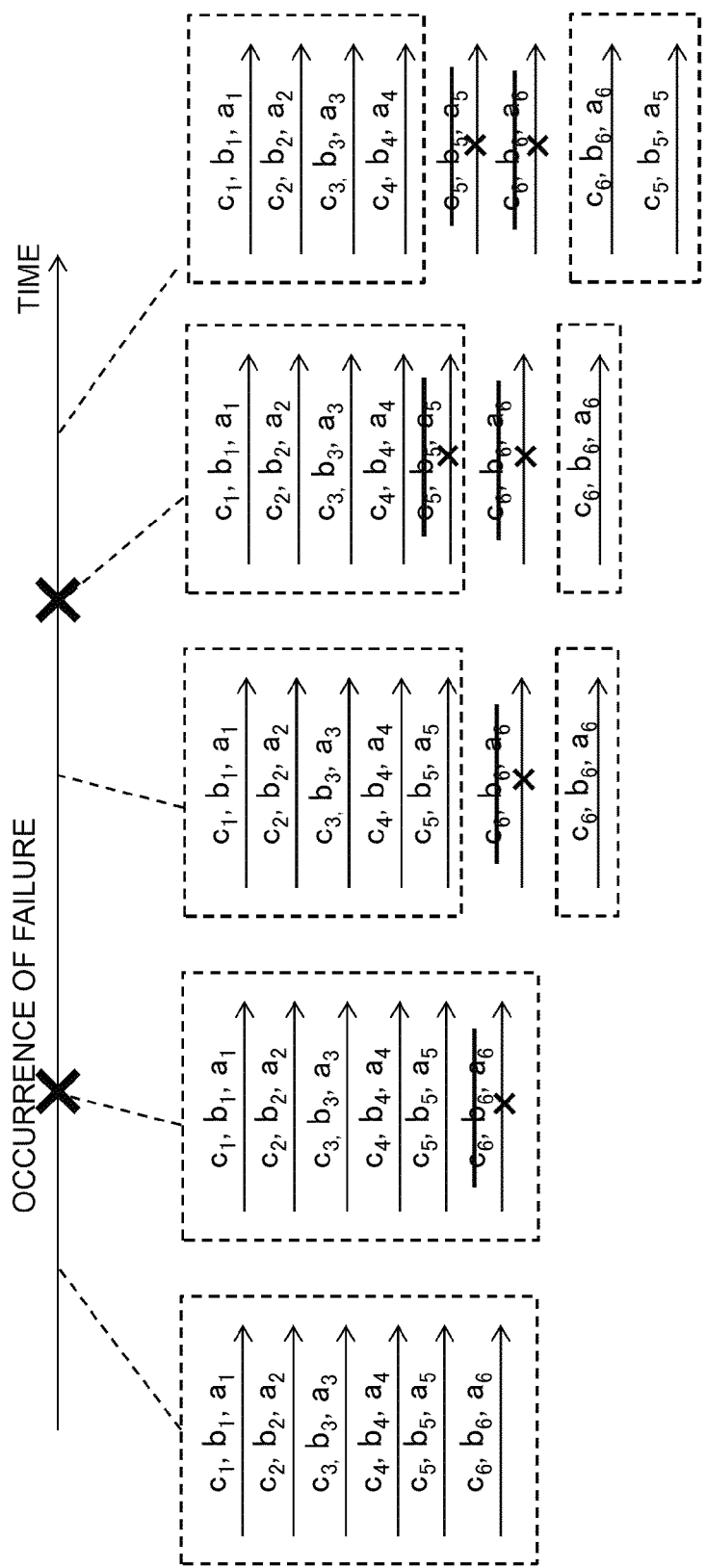
FIG. 22 is a view for explaining an operation of the transmission system according to the present disclosure.
Figure 23:
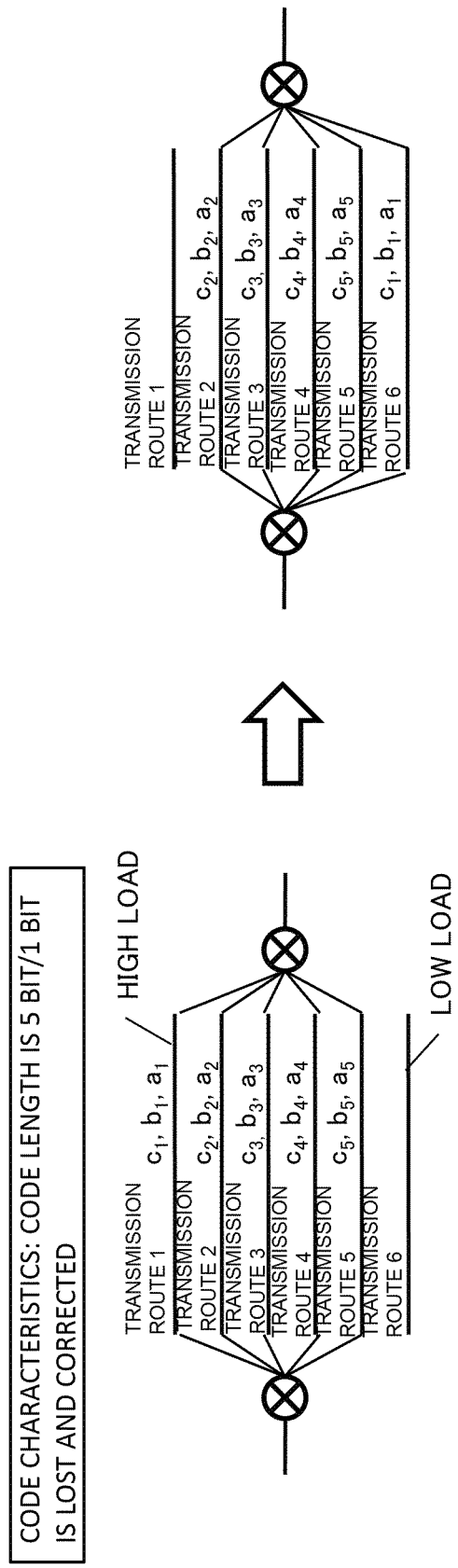
FIG. 23 is a view for explaining an operation of the transmission system according to the present disclosure.

In an embodiment 8, in the agent for configuration 60 of each of the transmission system 301 to transmission system 303, a coded data sequence transmitted using the transmission route concerned is commuted to an alternative transmission route. As an implementation use, there are setting of the alternative transmission route in the occurrence of the failure of the transmission route and load distribution and enhancement of resource use efficiency in a transmission system. FIG. 22 shows an application example of this embodiment led by a route failure. After the transmission route through which encoded data sequence {a6, b6, c6} is transferred is failed, the data sequence concerned is transferred to an alternative transmission route. After that, when the transmission route through which encoded data sequence {a5, b5, c5} is transferred is failed, the data sequence is similarly commuted and transferred to an alternative transmission route. This method has such a merit that as long as an alternative transmission route exists, the system operation can be maintained without rearranging encoded data sequence transferred in a normal transmission route as in the embodiment 7. The alternative transmission route may be previously provided before the transmission route failure or may be searched in the wake of the transmission route failure. When the alternative transmission route is not found, a new transmission route may be provided, or the embodiment 7 may be used. FIG. 23 shows an application example of this embodiment aiming at the load dispersion in the transmission system 301 to transmission system 303. In transmission routes 1 to 5, encoded data sequence having a code length of 5 bits and allowing 1 bit to be lost and corrected is transmitted. Since the transmission route 1 is used in other transmission, the traffic capacity is large, and the load is high; however, on the other hand, the load of the transmission route 6 is low. In this case, the transmission to the transmission route 1 is cut, and the transmission route is switched to the transmission route 6, whereby the load dispersion can be realized. In this example, even if the single transmission route is cut, correction can be accurately performed, and therefore, if power flicker occurs when the transmission route is switched from the transmission route 1 to the transmission route 6, data can be accurately transmitted.

When it is considered to apply the transmission system 301 to transmission system 303 of this embodiment to an optical path network using a wavelength multiplexing technology, an embodiment in which encoded data sequence is transferred using an optical path set in the transmission routes is considered. In this case, according to the present embodiment, a housing route and wavelength of each optical path can be changed based on network conditions, and wavelength resources in the optical path network can be effectively used. In the case of a conventional optical path network, when the above path arrangement change is performed, the power flicker is not made occur, and the arrangement change is required to be performed path by path; however, when similar path arrangement change is performed in the optical path network applying the transmission system of the present disclosure, since a plurality of paths are allowed to be temporarily cut, high operability and operational effect are obtained. This example is shown in FIG. 24. Regarding three nodes A, B, and C, in the optical path network in which each node is connected with fibers having a wavelength number of 3, an initial state is represented by (a). Transmission using the transmission system of this disclosure is performed between A and C and between B and C. In the connection between A and C and between B and C, it is assumed that three transmission routes are provided in each connection, and data can be accurately corrected in the cutting of one of the three transmission routes. Individual route and wavelength are allocated in each transmission route. Here, in a conventional optical path network in which the power flicker is not allowed, since the available number of the wavelength between A and C, and between B and C reaches the upper limit, the path arrangement cannot be changed from the state of (a). Meanwhile, in the optical path network applying the transmission system of the present disclosure, since the transmission routes A-B-C and B-A-C can be cut simultaneously, the path arrangement can be changed as shown in (b), and the wavelength resources of the entire network can be effectively used.

Embodiment 9

Figure 21:
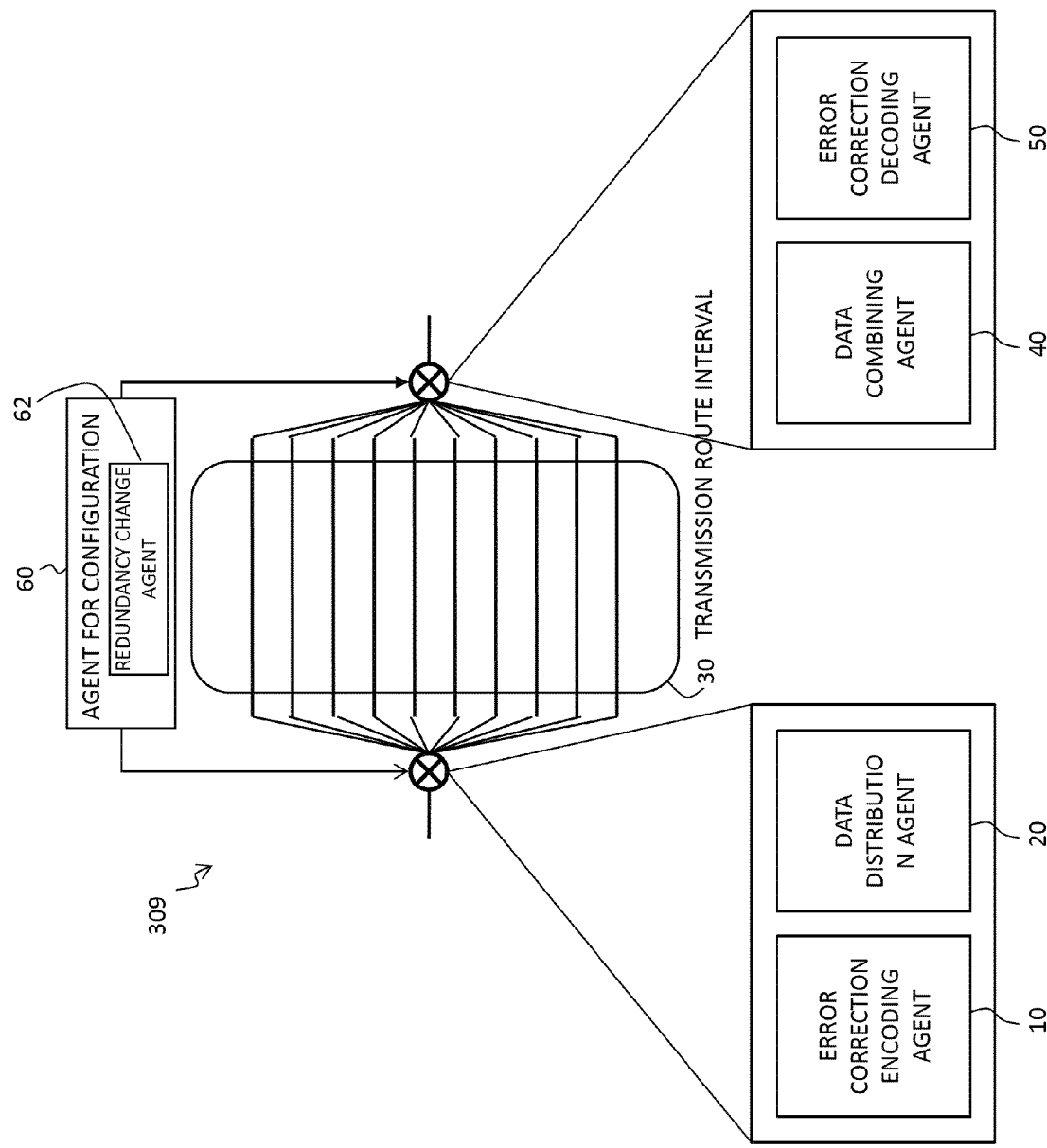
FIG. 21 is a view for explaining the transmission system according to the present disclosure.

A transmission system 309 of an embodiment 9 corresponds to the transmission system 301 to transmission system 303 in which the agent for configuration 60 changes the redundancy set to the input data sequence. FIG. 21 is a view for explaining a configuration of the transmission system 309. The agent for configuration 60 of the transmission system 309 is provided with redundancy change agent 62.

Figure 25:
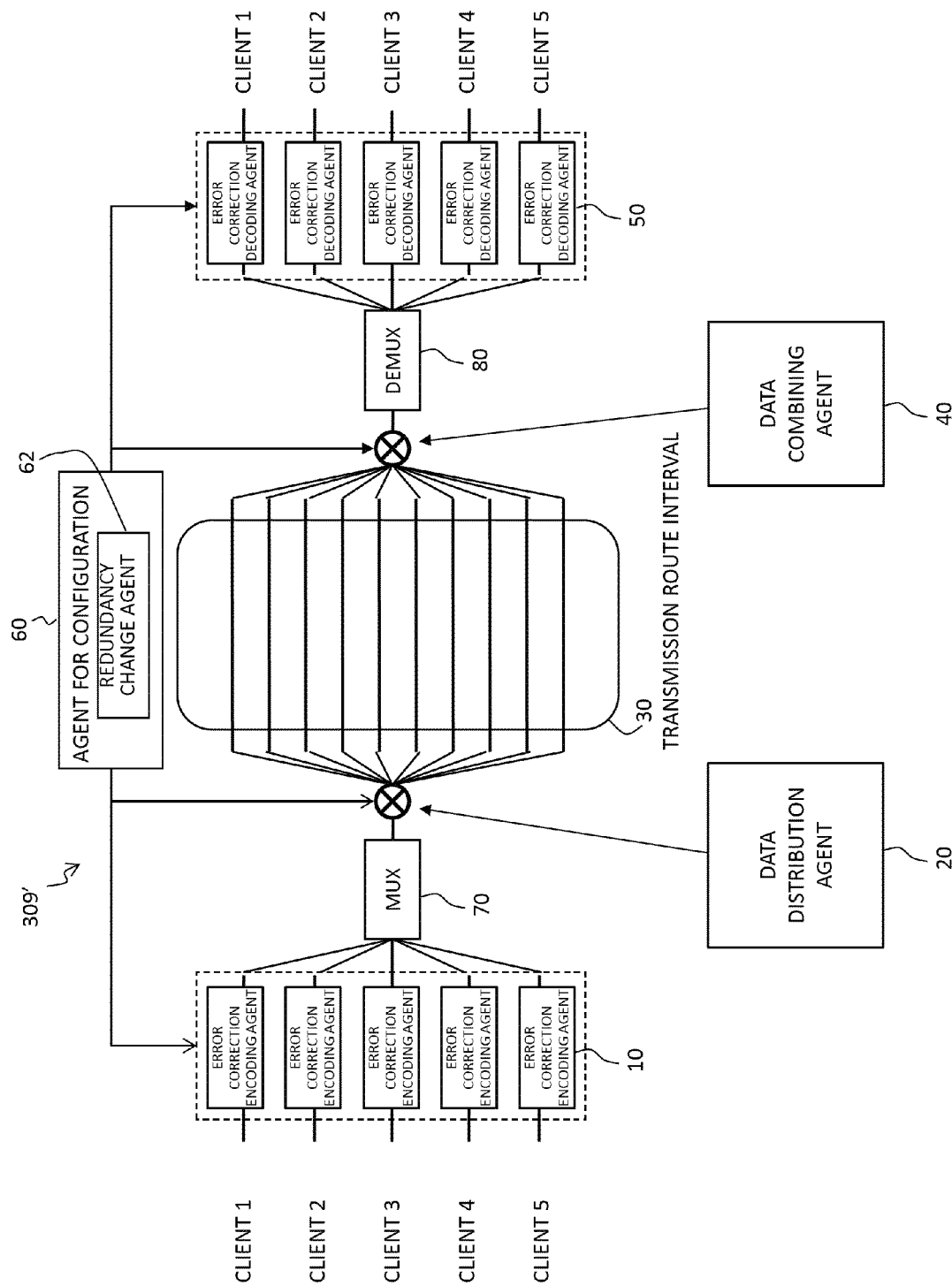
FIG. 25 is a view for explaining the transmission system according to the present disclosure.
Figure 26:
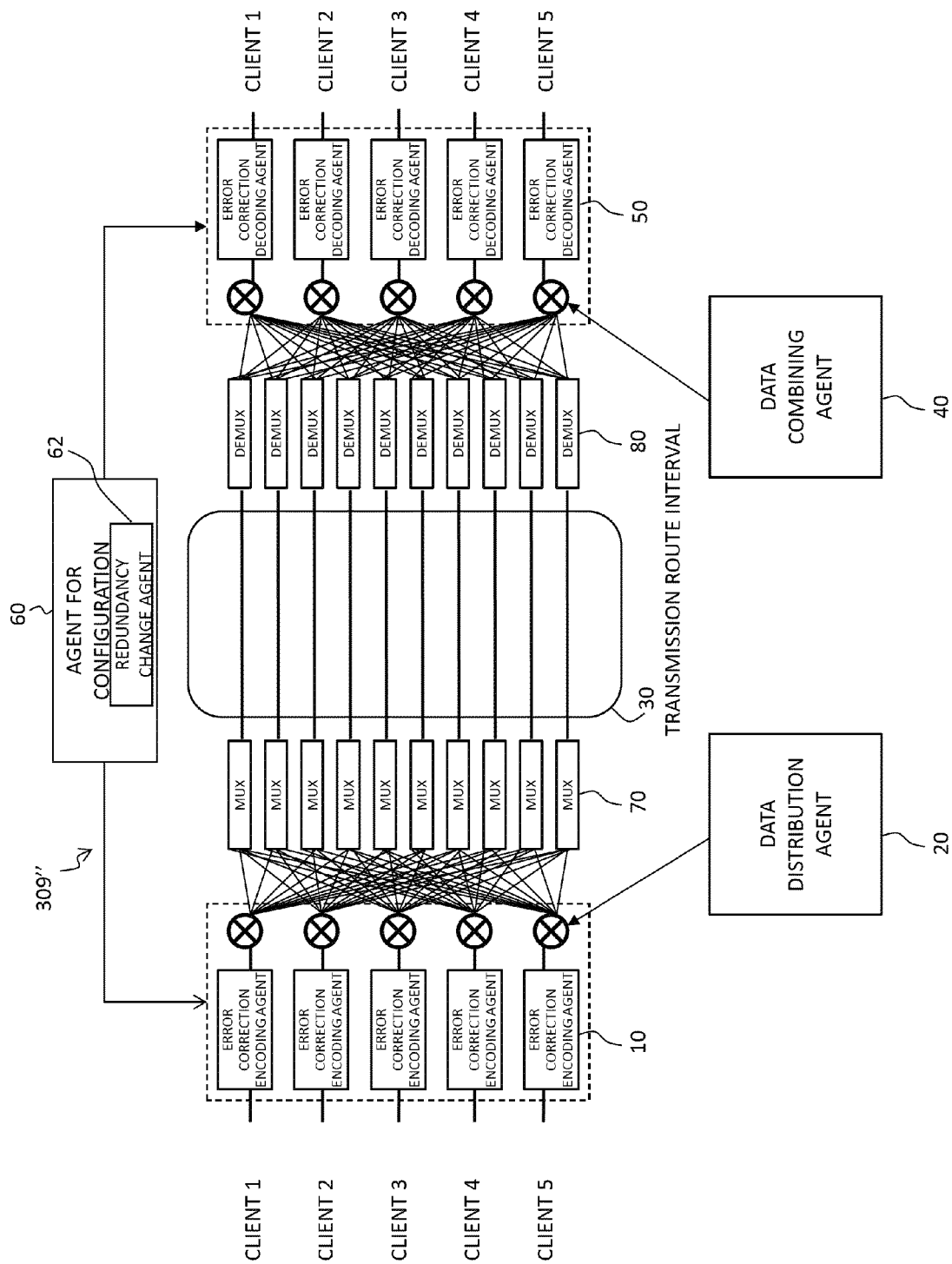
FIG. 26 is a view for explaining the transmission system according to the present disclosure.

In the present embodiment and the following embodiment, the agent for configuration 60 is provided with the redundancy change agent which changes the redundancy set to the input data sequence. When the error correction encoding agent 10 is provided for each client, not only the data distribution agent but also the error correction encoding agent 10 may be set by the agent for configuration 60, as shown in FIG. 25 and FIG. 26.

When a new client is connected to the transmission system and when the degree of splitting is reduced by using the embodiment 7 with respect to the occurrence of the transmission route failure, the traffic capacity may exceed a transmitted traffic volume capable of being accommodated in each transmission route. Especially, when the embodiment 7 is used, even if there is enough allowable failure number, restriction due to the transmitted traffic volume may be a bottleneck first. When the traffic capacity exceeds the transmitted traffic volume due to the restriction of the transmitted traffic volume, the redundancy included in the data sequence is reduced, whereby the data sequence may be transmitted without occurrence of overflow of the data. When the redundancy is changed to perform transmission, the redundancy can be changed in a range satisfying the following condition:

(Transmitted traffic volume of each transmission route)≥ (maximum value of transmitted traffic volume of each transmission route after change of the redundancy).

Figure 27:
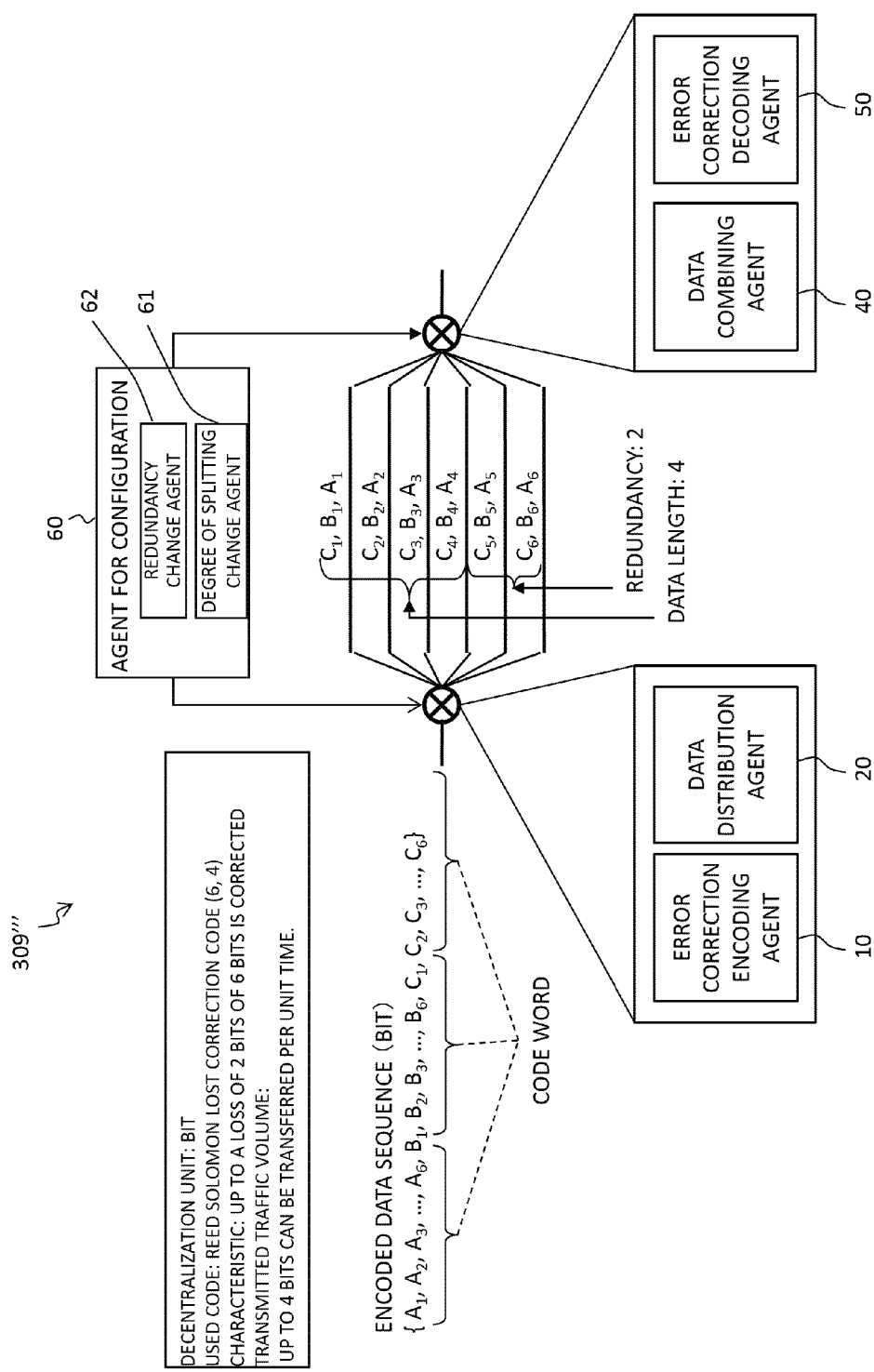
FIG. 27 is a view for explaining the transmission system according to the present disclosure.
Figure 28:
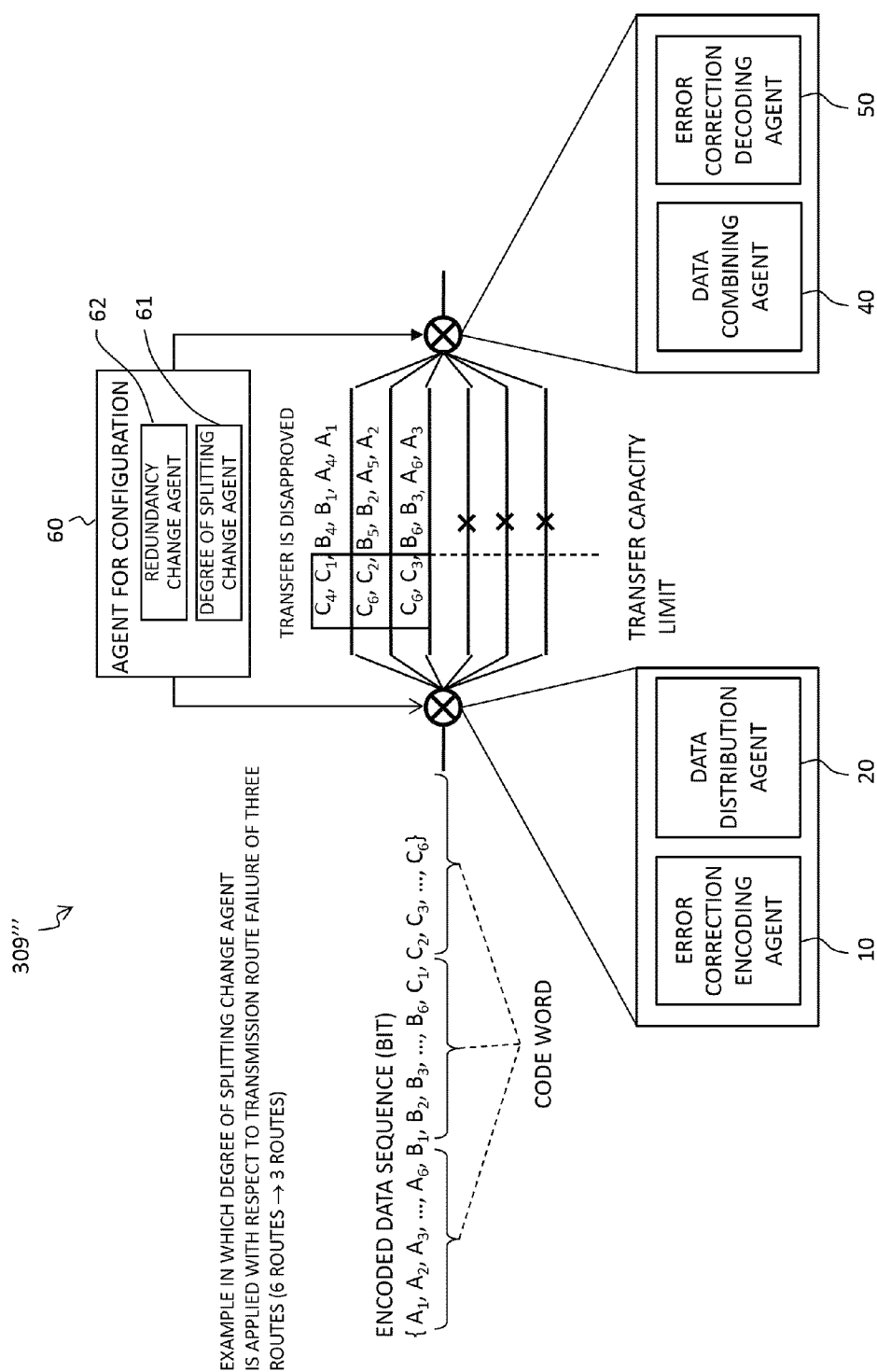
FIG. 28 is a view for explaining the transmission system according to the present disclosure.
Figure 29:
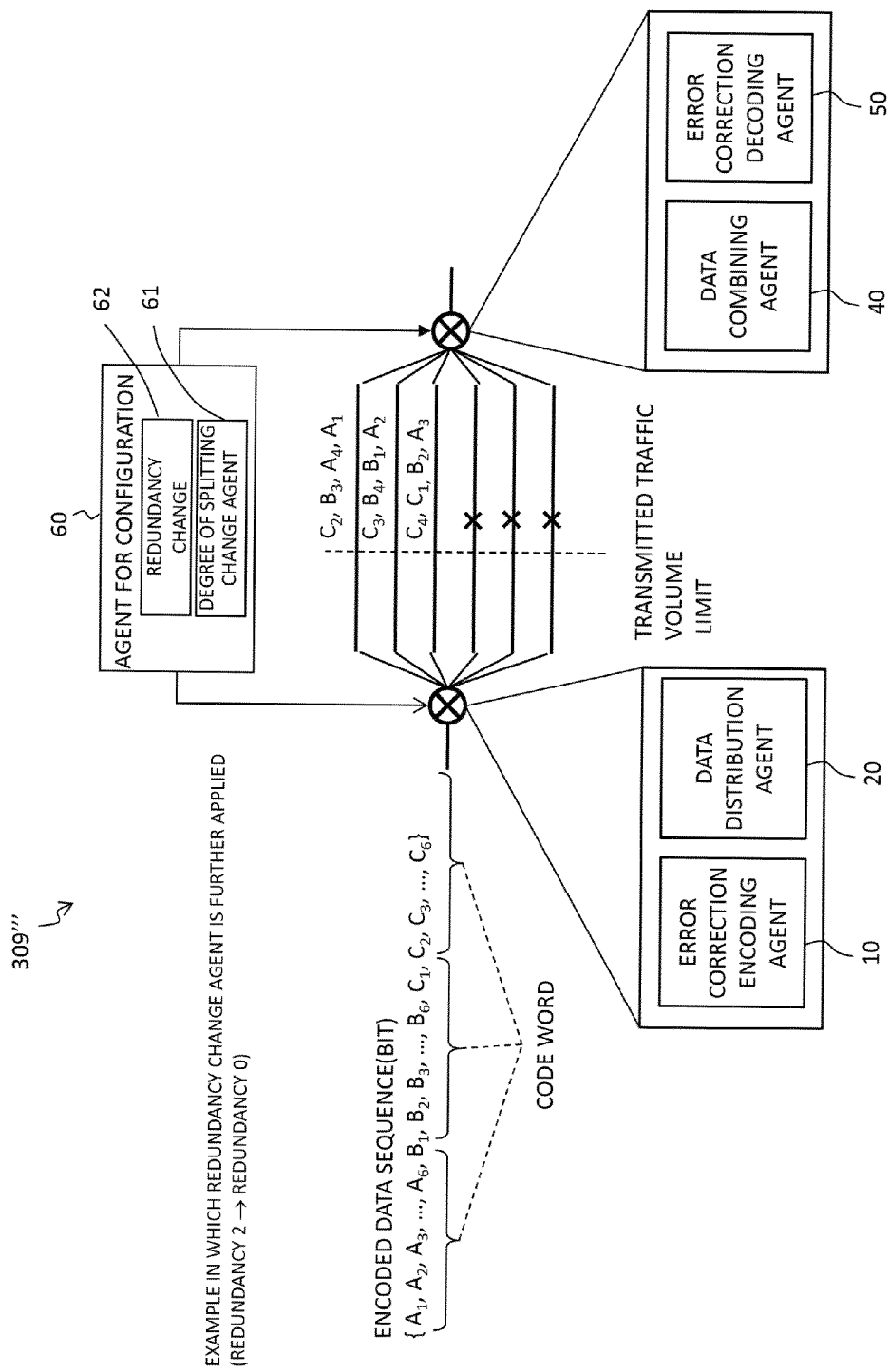
FIG. 29 is a view for explaining the transmission system according to the present disclosure.

The application effect of the redundancy change agent 62 will be described using FIG. 27 to FIG. 29. In FIG. 27 to FIG. 29, the agent for configuration 60 is provided with the degree of splitting change agent 61. It is assumed to use a correctable Reed-Solomon erasure correcting code with respect to disappearance up to 2 bits of 6 bits. The transmitted traffic volume in the transmission route is assumed to be 4 bits per unit time. In the transmission system 309 in which FIG. 27 is a normal state, an example in which three routes are failed is shown in FIG. 28. In this example, the number of the transmission routes through which transfer is performed using the degree of splitting change agent is limited to three. In this case, the traffic capacity with respect to the three transmission routes is 6 bit per unit time and exceeds the transmitted traffic volume in the transmission route; therefore, the overflow of data occurs, and thus normal transmission cannot be performed. The redundancy change agent 62 reduces the redundancy set by the error correction encoding agent 10. In the state of FIG. 28, the redundancy set by the error correction encoding agent 10 is reduced from 2 to 0, whereby, as shown in FIG. 29, the traffic capacity in each transmission route is reduced to 4. Thus, the redundancy is suitably changed with respect to the transmitted traffic volume limit, whereby transmission can be performed without the occurrence of the overflow of data.

In addition, the redundancy is changed based on, for example, a change of transfer requirements of a client, whereby flexible operation of the transmission system can be realized.

The change of the redundancy is realized by using the error correction encoding agent 10 which can dynamically changes the redundancy or providing a plurality of the error correction encoding agents 10 having different redundancies to switch the error correction encoding agent 10 with the use of a selector.

Embodiment 10

Figure 30:
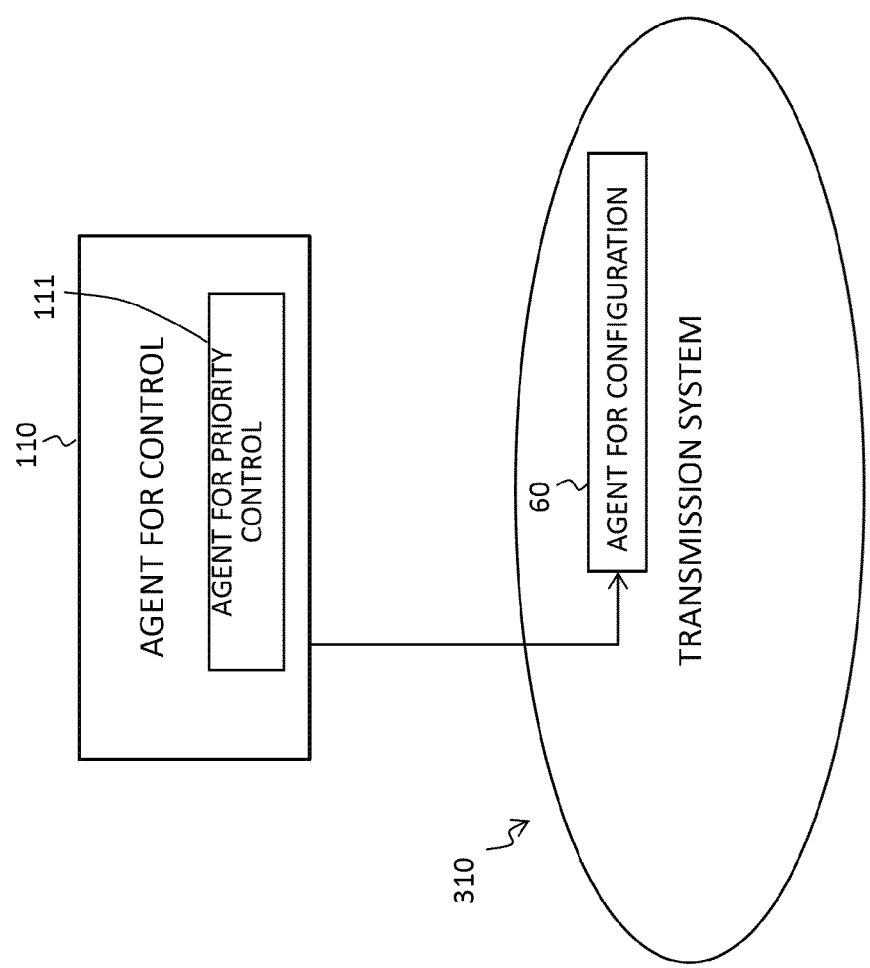
FIG. 30 is a view for explaining the transmission system according to the present disclosure.

A transmission system 310 of an embodiment 10 performs operation based on priority. FIG. 30 is a view for explaining a configuration of the transmission system 310. The transmission system 310 is provided with agent for priority control 111 which manages the operation based on the priority prescribed by control agent 110.

FIG. 31 shows a measure for maintaining the reliability for each client when the transmitted traffic volume limitation as in the embodiment 9 occurs with respect to the presence of each deployment of the redundancy change agent 62 and the agent for priority control 111. As a simple example, the priority is assumed to be set at two levels, high priority and low priority, for each client. The client represents a unit for discerning demand, such as a port ID and VLAN ID connected to the transmission system.

Hereinafter, an example in which the priority is set to the client and, at the same time, the redundancy is variable will be described. When a new client is connected, and when the system operating ratio is required to be maintained using the degree of splitting change agent 61 with respect to the transmission route failure, the overflow of allocated data may occur. In this case, as an approach for maintaining the system operation, a control is performed in the following order, for example, with respect to the clients which are always connected.

1) to reduce the redundancy of data input from a low priority client.
2) to thin out a portion of data input from the low priority client.
3) to reduce the redundancy of data input from a high priority client.

Among them, 1) and 3) are realized by the redundancy change agent 62 shown in the embodiment 9. The redundancy is changed with respect to individual clients in accordance with information about the priority of the client described in the agent for priority control 111.

For example when a packet communication device is included in the transmission system, 2) can be performed by using a polishing function in the device concerned. When the transmitted traffic volume restriction occurs even if the redundancy of the low priority client is lowered, the control agent thins data from the low priority client in cooperation with the packet communication device, whereby the system operating ratio of a higher priority client can be maintained.

The present embodiment is also applicable when the redundancy change agent 62 is not provided and only the agent for priority control 111 is provided. In this case, there is only an effect of temporarily thinning out low priority data in cooperation with the packet communication device.

Figure 32:
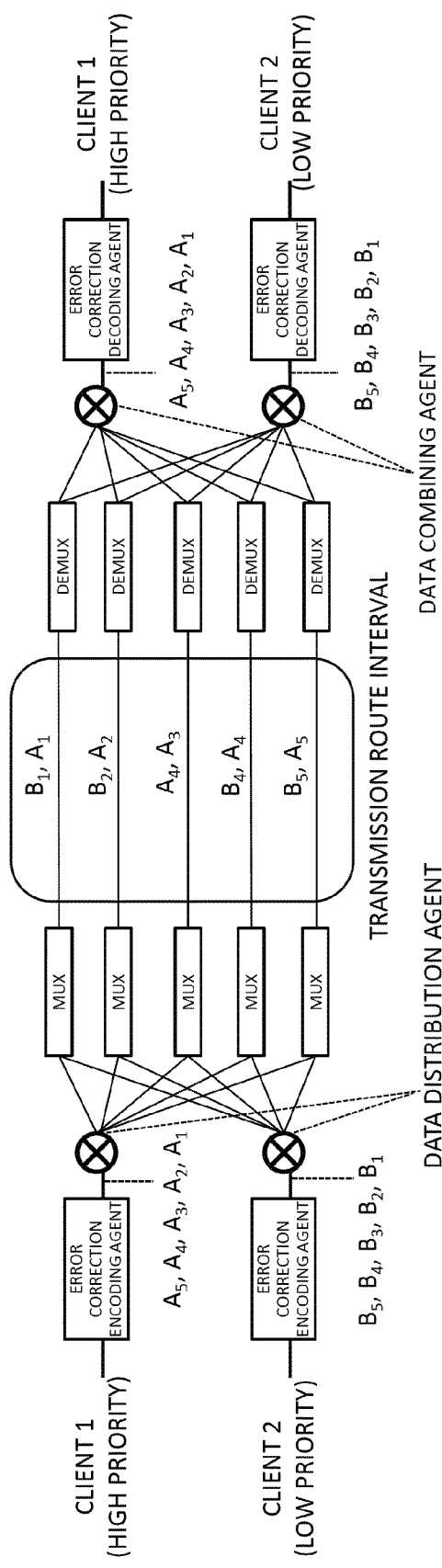
FIG. 32 is a view for explaining an operation of the transmission system according to the present disclosure.
Figure 33:
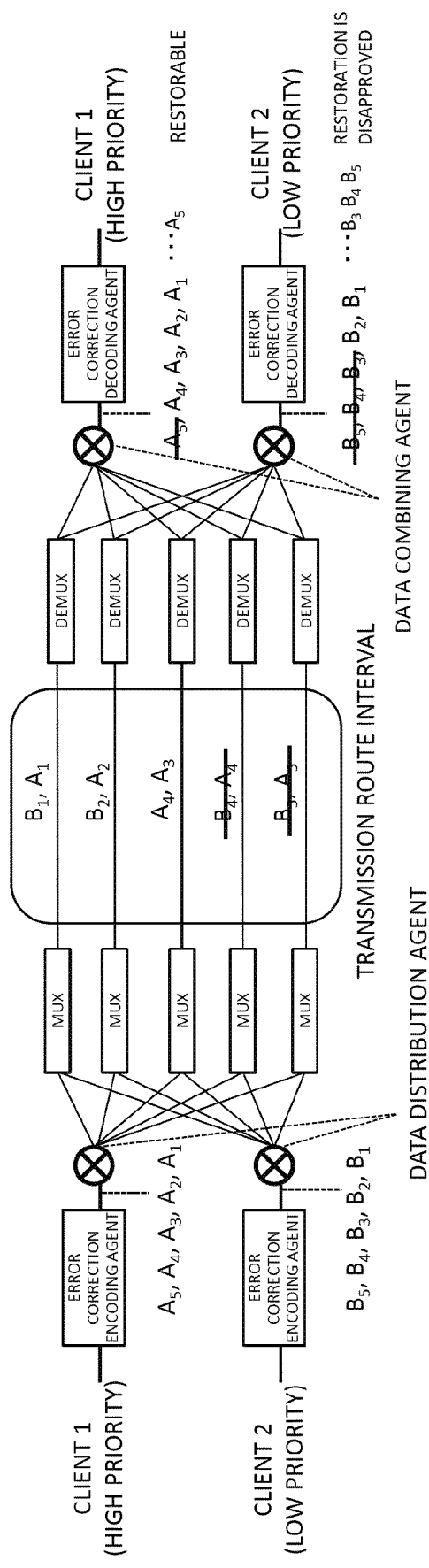
FIG. 33 is a view for explaining an operation of the transmission system according to the present disclosure.

An example is shown using FIG. 32. FIG. 32 shows an example in which two clients having different priorities are connected to a transmission system having a correcting capability with respect to a failure of the single transmission route. The input data sequence input from a high priority client 1 is converted into a coded data sequence {a1, a2, a3, a4, a5} by the error correction encoding agent, and the input data sequence input from a low priority client 2 is converted into a coded data sequence {b1, b2, b3, b4, b5} and is then transmitted. An example in which two transmission routes are failed is shown in FIG. 33. In this case, since the number of the transmission route failures exceeds the allowable number, in a usual case in which the priority is not considered, neither the client 1 nor 2 cannot transmit data normally. However, according to the present embodiment, when a failure occurs, a high priority data sequence is preferentially sorted into a normal transmission route, whereby coded data sequence of the high priority client 1 can be normally restored.

Other Embodiment

The transmission route 30 in all the above embodiments may be an optical transmission path using an optical fiber or a transmission route through which light is propagated in a free space. Moreover, a wireless communication transmission path using radio waves and a metallic transmission path such as a copper wire are applicable.

As agent which multiplexes and separates signals from the clients, there can be used a method of allocating, for example, an ODU path using a time-division multiplex technique recommended by ITU-T G.709 for each client in the multiplexing and separating the ODU path in separation agent.

Figure 5:
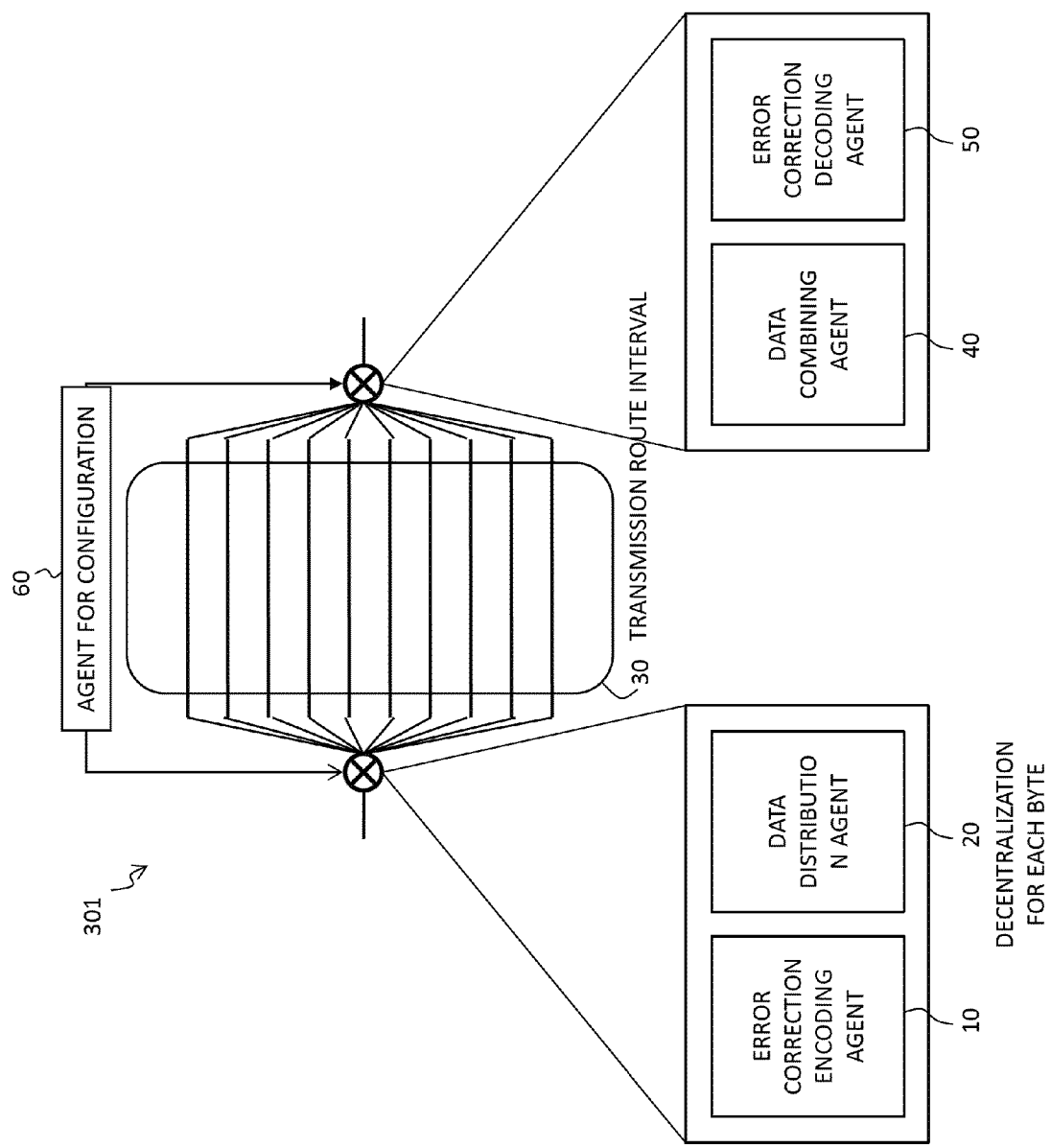
FIG. 5 is a view for explaining the transmission system according to the present disclosure.
Figure 6:
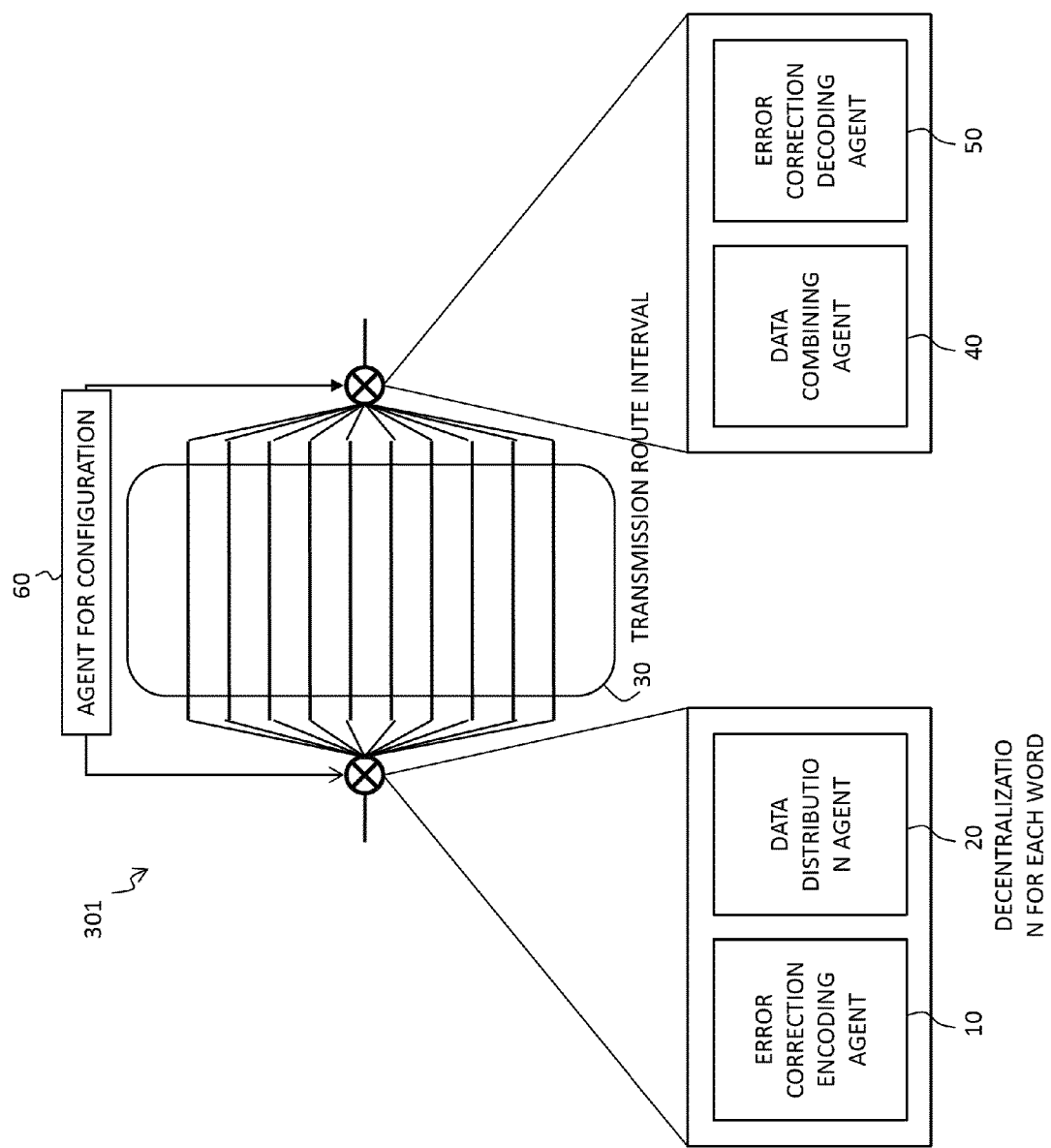
FIG. 6 is a view for explaining the transmission system according to the present disclosure.

In the data distribution agent 20, in addition to the method of performing decentralization for each bit of FIG. 4 as the predetermined processing unit, the decentralization in the unit of byte and the decentralization in the unit of word shown in FIG. 5 and FIG. 6 may be applied. In this case, in the transmission system 301, the length of one period of decentralized data as in the condition 3 is required to be rendered equal to or larger than the code word length of the error correction method or the interleave length for the purpose of complete failure relief.

(Condition 3)

Complete protection (complete error correction) condition length of one period of decentralized data code word length or interleave length

EXPLANATION OF TERMS

The terms used in the present specification will be described.

"Correctable error interval": it is determined by a performance of an error correction code to be used in both bits and bytes and is an index showing a correctable upper limit of frequency of occurrence of an error.

"Length of one period of decentralized data": for example, when decentralization to 10 routes is performed for each 1 bit, the length concerned is 10 bits.

"Code word length used in error correction code": it is the length of data after the data is subjected to error correction coding. More specifically, it is the data length+the length of the redundancy.

"Interleave length": it is a length of a data buffer provided for securing the randomness of data. The larger the interleave length, the greater the randomness.

"Division unit of decentralized data": it is a predetermined processing unit, every 1 bit in the unit of bit, and every 8 bits in the unit of byte.

"Burst error proof stress": an upper limit of the number of bits capable of being relieved when errors occur continuously.

"Multiplicity of multiple failure": in a double failure, it means a situation in which two failures occurs simultaneously.

"Convolution code": it is an error correction code produced by a logic circuit constituted of a shift resistor and an exclusive circuit and is a code in which input signal sequences are subjected to convolution processing in sequence.

"The number of memories of the convolution code": it is the number of stages of the shift register.

"Convolutional code constraint length": it is the number of the memories+1.

"Coding ratio of the convolution code": it is a ratio of (input bit number/output bit number) when the convolution code is produced.

As described above, the present disclosure can provide a transmission system, which can perform a transfer service with higher reliability, even using a smaller amount of network resources and can flexibly reliability design depending on the application, and a transmission method.

EXPLANATION OF INDICIA

10: error correction encoding agent
20: data distribution agent
30, 30-1, 30-2, and . . . : Transmission route
40: Data combining agent
50: error correction decoding agent
60: Agent for configuration
61: Degree of splitting change agent
62: Redundancy change agent
70: Multiplexing agent
80: Separation agent
90: Data for time sequence control input agent
100: Agent for relative delay compensation
111: Agent for priority control
110: Control agent
301 to 304, 307, 309, 310: Transmission system

The invention claimed is:

1. A transmission system comprising:
   an error correction encoding agent which converts an input data sequence into an encoded data sequence constituted of an error correction code and coded data;
   a data distribution agent which divides the encoded data sequence from the error correction encoding agent, in a predetermined processing unit and sends them to a plurality of transmission routes;
   a data combining agent which combines signal sequences from the respective transmission routes and restores the encoded data sequence;
   an error correction decoding agent which applies error correction to and decodes the encoded data sequence from the data combining agent and outputs the input data sequence; and
   an agent for configuration in which a redundancy in the error correction encoding agent and a degree of splitting of the encoded data sequence in the data distribution agent are set.

2. The transmission system according to claim 1, wherein the agent for configuration sets an error correcting capability and a number of split paths in the error correction encoding agent so that an availability of the plurality of transmission routes, and an availability of the entire transmission system of the input data sequence given by the error correcting capability and the number of split paths in the error correction encoding agent satisfy a required availability of the entire transmission system.

3. The transmission system according to claim 1, further comprising:
   a data for time sequence control input agent which, with regard to the encoded data sequences divided by the data distribution agent, adds data for time sequence control, specifying a temporal position before sending to the plurality of transmission routes, to each of the signal sequences; and
   an agent for relative delay compensation which absorbs a delay difference in each of the transmission routes of the signal sequence with reference to the data for time sequence control added by the data for time sequence control input agent and inputs the delay difference to the data combining agent.

4. The transmission system according to claim 1, further comprising:
   a multiplexing agent which makes the encoded data sequences, propagating each of the transmission routes, a data sequence in which data sequences based on the input data sequences from a plurality of clients are multiplexed; and
   a separation agent which separates the encoded data sequences, propagating each of the transmission routes, for each data sequence based on the input data sequences from the plurality of clients.

5. The transmission system according to claim 4, further comprising a control agent which sets the redundancy in the error correction encoding agent and the degree of splitting of the encoded data sequence in the data distribution agent are set in the agent for configuration for each client.

6. The transmission system according to claim 1, wherein the agent for configuration sets a change of the degree of splitting of the encoded data sequence to the data distribution agent and the data combining agent.

7. The transmission system according to claim 1, wherein the agent for configuration transmits the encoded data sequence which is transmitted to some of the transmission routes while commuting to the other of the transmission routes.

8. The transmission system according to claim 1, wherein the agent for configuration sets a change of the redundancy to the input data sequence in the error correction encoding agent and the error correction decoding agent.

9. The transmission system according to claim 5, wherein the control agent sets or changes the degree of splitting of the encoded data sequence or the redundancy to the input data sequence based on a prescribed priority.

10. A transmission control method of controlling a transmission system comprising:
- an error correction encoding agent which converts an input data sequence into an encoded data sequence constituted of an error correction code and coded data;
- a data distribution agent which divides the encoded data sequence, from the error correction encoding agent, in a predetermined processing unit and send them to a plurality of transmission routes;
- a data combining agent which combines signal sequences from the respective transmission routes and restores the encoded data sequence; and
- an error correction decoding agent which applies error correction to and decodes the encoded data sequence from the data combining agent and outputs the input data sequence,
- wherein a redundancy in the error correction encoding agent and a degree of splitting of the encoded data sequence in the data distribution agent are set according to reliability of the transmission system.

11. The transmission method according to claim 10, wherein an error correcting capability and a number of split paths in the error correction encoding agent are set so that an availability of the plurality of transmission routes, and an availability of the entire transmission system of the input data sequence given by the error correcting capability and the number of split paths in the error correction encoding agent satisfy a required availability of the entire transmission system.

12. The transmission method according to claim 10, wherein with regard to the encoded data sequences divided by the data distribution agent, data for time sequence control specifying a temporal position before sending to the plurality of transmission routes is added to each of the encoded data sequences divided by the data distribution agent, the data for time sequence control added respectively to the encoded data sequence propagating the transmission route is referred, and a delay difference in each of the transmission routes of the encoded data sequence divided by the data distribution agent is absorbed.

13. The transmission method according to claim 10, wherein the encoded data sequence propagating each of the transmission routes is made a data sequence in which data sequences based on the input data sequence from a plurality of clients are multiplexed, and encoded data sequences propagating each of the transmission routes is separated for each data sequence based on the input data sequences from the plurality of clients.

14. The transmission method according to claim 13, wherein the redundancy in the error correction encoding agent and the degree of splitting of the encoded data sequence in the data distribution agent are set for each client.

15. The transmission method according to claim 10, wherein a change of the degree of splitting of the encoded data sequence is set to the data distribution agent and the data combining agent.

16. The transmission method according to claim 10, wherein the encoded data sequence which is transmitted to some of the transmission routes while being commuted is transmitted to the other of the transmission routes.

17. The transmission method according to claim 10, wherein a change of the redundancy to the input data sequence is set in the error correction encoding agent and the error correction decoding agent.

18. The transmission method according to claim 14, wherein the degree of splitting of the encoded data sequence or the redundancy to the input data sequence are set or changed based on a prescribed priority.

* * * * *